(12) United States Patent
Kouno et al.

(10) Patent No.: US 10,967,590 B2
(45) Date of Patent: Apr. 6, 2021

(54) TIRE

(71) Applicant: BRIDGESTONE CORPORATION, Tokyo (JP)

(72) Inventors: Yoshihide Kouno, Kodaira (JP); Seiji Kon, Kodaira (JP); Keiichi Hasegawa, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 751 days.

(21) Appl. No.: 15/582,920

(22) Filed: May 1, 2017

(65) Prior Publication Data

US 2017/0232697 A1    Aug. 17, 2017

Related U.S. Application Data

(62) Division of application No. 14/364,763, filed as application No. PCT/JP2012/082095 on Dec. 11, 2012, now Pat. No. 9,902,121.

(30) Foreign Application Priority Data

Dec. 12, 2011 (JP) .............................. JP2011-271329

(51) Int. Cl.
  B29D 30/08 (2006.01)
  B60C 15/06 (2006.01)
  (Continued)

(52) U.S. Cl.
  CPC ......... B29D 30/0678 (2013.01); B29D 30/48 (2013.01); B60C 5/007 (2013.01);
  (Continued)

(58) Field of Classification Search
  CPC .......... B29D 30/0678; B29D 2030/481; B60C 15/06; B60C 15/0603; B60C 15/0607
  See application file for complete search history.

(56) References Cited

U.S. PATENT DOCUMENTS 3,372,894 A * 3/1968 Pearce ................... B29D 30/48
                                                           245/1.5
3,945,420 A * 3/1976 Gorter ................... B29D 29/00
                                                           152/452

(Continued)

FOREIGN PATENT DOCUMENTS

| CN | 2499256 Y | 7/2002 |
|---|---|---|
| JP | 4833501 A | 5/1973 |

(Continued)

OTHER PUBLICATIONS

An Office Action dated Nov. 4, 2016, which issued during the prosecution of U.S. Appl. No. 14/364,763.

(Continued)

*Primary Examiner* — Justin R Fischer
(74) *Attorney, Agent, or Firm* — Sughrue Mion, PLLC

(57) ABSTRACT

A tire includes: a tire frame member formed in a ring shape from a frame resin material, and including a pair of bead sections, a pair of side sections, and a crown section; a ring shaped bead core that is embedded in and joined to each of the bead sections, and that is formed by a single strand, or plurality of strands, of bead cord extending in the tire circumferential direction, and covered with, and joined to, a covering resin material; and an extension portion that extends from each of the bead cores in a direction that intersects with the tire circumferential direction when viewed from a tire side face, and that is joined to the tire frame member.

19 Claims, 13 Drawing Sheets

(51) Int. Cl.

| | | |
|---|---|---|
| *B29D 30/06* | (2006.01) | |
| *B60C 5/00* | (2006.01) | |
| *B60C 15/04* | (2006.01) | |
| *B60C 5/01* | (2006.01) | |
| *B29D 30/48* | (2006.01) | |
| *B60C 15/05* | (2006.01) | |
| B60C 1/00 | (2006.01) | |
| B29K 101/12 | (2006.01) | |

(52) U.S. Cl.
CPC .............. *B60C 5/01* (2013.01); *B60C 15/04* (2013.01); *B60C 15/05* (2013.01); *B60C 15/0603* (2013.01); *B29D 2030/482* (2013.01); *B29D 2030/485* (2013.01); *B29K 2101/12* (2013.01); *B60C 2001/0058* (2013.01)

(56) References Cited

U.S. PATENT DOCUMENTS

| | | | | |
|---|---|---|---|---|
| 4,168,193 | A * | 9/1979 | Brunet | B29C 35/02 |
| | | | | 152/540 |
| 4,202,717 | A * | 5/1980 | Seiberling | B29D 30/0005 |
| | | | | 152/540 |
| 4,226,663 | A * | 10/1980 | Pirovano | B29D 30/48 |
| | | | | 156/422 |
| 4,253,513 | A * | 3/1981 | Larson | B29D 30/06 |
| | | | | 152/452 |
| 4,277,295 | A | 7/1981 | Schmidt et al. | |
| 5,127,456 | A * | 7/1992 | Davriu | B29C 53/564 |
| | | | | 152/54 |
| 5,798,127 | A * | 8/1998 | Thayer | B29C 45/2616 |
| | | | | 425/117 |

FOREIGN PATENT DOCUMENTS

| | | | |
|---|---|---|---|
| JP | 49-127301 | * | 12/1974 |
| JP | 5539398 A | | 3/1980 |
| JP | 2003-104008 A | | 4/2003 |
| JP | 2006282102 A | | 10/2006 |
| JP | 2010188634 A | | 9/2010 |
| WO | 2011122450 A1 | | 10/2011 |

OTHER PUBLICATIONS

An Office Action dated Jun. 13, 2016, which issued during the prosecution of U.S. Appl. No. 14/364,763.
An Office Action dated May 10, 2017, which issued during the prosecution of U.S. Appl. No. 14/364,763.
Amendment under 37 C.F.R. § 1.114(c) dated Apr. 27, 2017, which was filed during the prosecution of U.S. Appl. No. 14/364,763.
Amendment under 37 C.F.R. § 1.111 dated Oct. 13, 2016, which was filed during the prosecution of U.S. Appl. No. 14/364,763.
U.S. Appl. No. 14/364,763, Yoshishide Kouno, et al., filed Jun. 12, 2014.
Preliminary Amendment filed Jun. 12, 2014 in U.S. Appl. No. 14/364,763.
Amendment Under 37 C.F.R § 1.111 filed Oct. 13, 2016 in U.S. Appl. No. 14/364,763.
Communication dated Mar. 21, 2017, from the United States Patent and Trademark Office in counterpart U.S. Appl. No. 14/364,763.
International Search Report for PCT/JP2012/082095 dated Feb. 12, 2013.
Machine translation of JP 2003-104008, 2003.
Written Opinion for PCT/JP2012/082095 dated Feb. 12, 2013.
Communication dated Oct. 9, 2015 from the State Intellectual Property Office of the People's Republic of China in counterpart application No. 201280061469.6.

* cited by examiner

TIRE

CROSS-REFERENCE TO RELATED PATENT APPLICATIONS

This is a divisional application of U.S. patent application Ser. No. 14/364,763, filed Jun. 12, 2014, which is a National Stage entry of International Application No. PCT/JP2012/082095, filed Dec. 11, 2012, which claims priority to Japanese Patent Application No. 2011-271329, filed Dec. 12, 2011. The entire disclosures of the prior applications are considered part of the disclosure of this application, and are hereby incorporated by reference.

TECHNICAL FIELD

The present invention relates to a tire with at least a portion formed from a resin material.

BACKGROUND ART

Known pneumatic tires employed in vehicles such as cars are configured for example from rubber members, members made from organic fiber materials, and steel members. However, used rubber has limited applications in recycling, with rubber being disposed of, for example, with thermal recycling by incineration, or by shredding for use as a road surfacing material.

Recently, the use of thermoplastic materials such as thermoplastic resins and thermoplastic elastomers as tire materials is being demanded from the perspectives of weight reduction and ease of recycling. For example, Japanese Patent Application Laid-Open (JP-A) No. 2010-188634 (Patent Document 1) discloses a tire manufacturing method in which a tire frame member that configures a frame section of a tire is formed from a thermoplastic material. In the tire manufacturing method disclosed in JP-A No. 2010-188634, a bead core is laid out in a cavity of a mold for forming the tire frame member, and then molten thermoplastic material is poured into the cavity to form the tire frame member.
Patent Document 1: JP-A No. 2010-188634

DISCLOSURE OF INVENTION

Technical Problem

However, it is considered that there is still room for improvement regarding the joining force between the tire frame member formed by the above method and the bead core. An object of the present invention is to raise the joining force between the tire frame member and the bead core.

Solution to Problem

A tire of a first aspect of the present invention includes: a tire frame member formed in a ring shape from a frame resin material, and including a pair of bead sections disposed separated from each other along the tire width direction, a pair of side sections that extend from the pair of bead sections toward the tire radial direction outside, and a crown section that connects together the pair of side sections; a ring shaped bead core that is embedded in and joined to each of the bead sections, and that is formed by a single strand, or plural strands, of bead cord extending in the tire circumferential direction, and covered with, and joined to, a covering resin material; and an extension portion that extends from each of the bead cores in a direction that intersects with the tire circumferential direction when viewed from a tire side face, and that is joined to the tire frame member.

In the tire of the first aspect, the bead cores, and the respective extension portions that extend from the bead core, are joined to the tire frame member. This increases the joining surface area between the bead cores and the tire frame member compared, for example, to a configuration without the extension portions, and accordingly raises the joining force between the tire frame member and the bead core.

The tire of the first aspect accordingly enables the joining force between the tire frame member and the bead core to be raised.

A tire of a second aspect of the present invention is the tire of the first aspect, wherein the extension portion extends from the bead core toward the tire radial direction outside.

In the tire of the second aspect, the extension portion extends from each of the bead cores toward the tire radial direction outside, thereby enabling the extension length of the extension portion to be lengthened compared to, for example, a configuration in which the extension portion extends out from each of the bead cores toward the tire radial direction inside.

A tire of a third aspect of the present invention is the tire of the second aspect, wherein the extension portion is inserted into the side section.

The forces (and the directions of these forces) received by the tire during running are respectively different for the bead sections, the side sections and the crown section. In the tire of the third aspect, inserting the extension portions into the side sections, that receive different forces to the bead sections, enables the propagation of delamination between the extension portions and the tire frame member to be suppressed.

A tire of a fourth aspect of the present invention is the tire of the third aspect, wherein the extension portion is inserted into the crown section.

In the tire of the fourth aspect, inserting the extension portions into the crown section, that receives different forces to those of the bead sections and the side sections, enables the propagation of delamination between the extension portions and the tire frame member to be effectively suppressed.

A tire of a fifth aspect of the present invention is the tire of the first aspect, wherein plural of the extension portions are formed at intervals around the tire circumferential direction.

In the tire of the fifth aspect, forming plural of the extension portions at intervals around the tire circumferential direction enables the joining surface area between the bead cores and the tire frame member to be increased further.

A tire of a sixth aspect of the present invention is the tire of the first aspect, wherein the covering resin material exhibits thermo-plasticity, and the bead core and the tire frame member are joined together by welding.

In the tire of the sixth aspect, joining together the bead cores and the tire frame member by welding enables the bead cores and the tire frame member to be joined together simply and strongly.

A tire of a seventh aspect of the present invention is the tire of the first aspect, wherein: each of the extension portions is formed with the same material as the covering resin material, and is joined to the tire frame member by welding.

In the tire of the seventh aspect, forming the extension portions with the same material as the covering resin material enables production costs to be suppressed. Joining the extension portions to the tire frame member by welding enables the extension portions and the tire frame member to be joined together simply and strongly.

A tire of an eighth aspect of the present invention is the tire of the seventh aspect, wherein the extension portion is formed by extending a portion of the covering resin material configuring the bead core toward the tire radial direction outside.

In the tire of the eighth aspect, forming the extension portions by extending a portion of the covering resin material configuring the bead core toward the tire radial direction outside enables the need for a process to join separate bodies of the extension portions onto the bead cores to be eliminated, compared, for example, to a configuration in which the extension portions are separate bodies to be joined to the bead cores, and moreover enables sufficient strength to be assured between the bead cores and the extension portions.

A tire of a ninth aspect of the present invention is the tire of the first aspect, wherein the covering resin material has higher adhesive properties to the bead cord than the frame resin material, and is bonded to the bead cord.

In the tire of the ninth aspect, employing a material having higher adhesive properties to the bead cord than the frame resin material as the covering resin material enables the two members to be joined (bonded) strongly even without employing a bonding agent or the like between the covering resin material and the bead cords. This thereby enables a process to apply a bonding agent to the bead cords to be eliminated, improving productivity.

A tire of a tenth aspect of the present invention is the tire of the first aspect, wherein the covering resin material and the frame resin material are the same material as each other.

In the tire of the tenth aspect, employing the same material for the covering resin material and the frame resin material enables the production cost to be lowered compared to a configuration employing plural resin materials.

A tire of an eleventh aspect is the tire of the first aspect, wherein the bead core is formed by winding the bead cord, covered with and joined to the covering resin material, plural times along the tire circumferential direction, and by joining together the covering layers of the adjacent bead cords.

In the tire of the eleventh aspect, forming the bead core by winding the bead cord, covered with and joined to the covering resin material, plural times along the tire circumferential direction, and by joining together the covering layers of the adjacent bead cords, enables a stronger fixing between the covering resin material and the bead cords than, for example, a configuration in which a bead cord is wound plural times along the tire circumferential direction, and then the outer periphery thereof is covered with, and joined to, a covering resin material.

Advantageous Effects of Invention

As explained above, a tire of the present invention enables the joining force between the tire frame member and the bead cores to be raised.

BEST MODE FOR CARRYING OUT THE INVENTION

First Exemplary Embodiment

Explanation next follows regarding a tire of a first exemplary embodiment of the present invention, with reference to FIG. 1 to FIG. 4.

Figure 1:
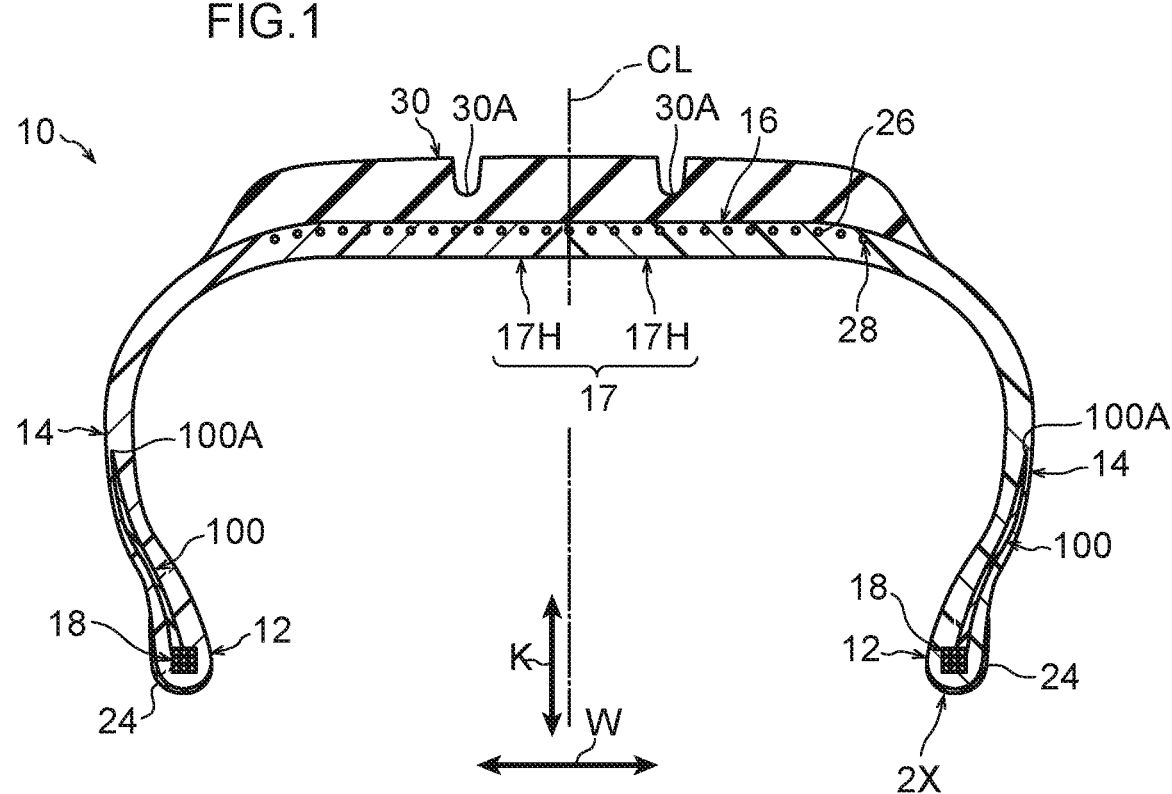
FIG. 1 is a cross-section of a tire of a first exemplary embodiment, taken along the tire width direction.

As illustrated in FIG. 1, a tire 10 of the first exemplary embodiment exhibits a cross-section profile that is substantially the same as a conventional ordinary rubber pneumatic tire. Note that the tire width direction is indicated in FIG. 1 to FIG. 4 by arrow W, and the tire radial direction is indicted by arrow K.

The tire 10 includes a tire case 17, serving as an example of a tire frame member that forms a tire frame section. The tire case 17 is configured by forming a resin material 17A for tire frame use (referred to below as "frame resin material") in a circular ring shape.

The tire case 17 is configured including a pair of bead sections 12 disposed at a separation from each other in the tire width direction, a pair of side sections 14 that respectively extend from the pair of bead sections 12 toward the tire radial direction outside, and a crown section 16 that connects together the pair of side sections 14.

Figure 2:
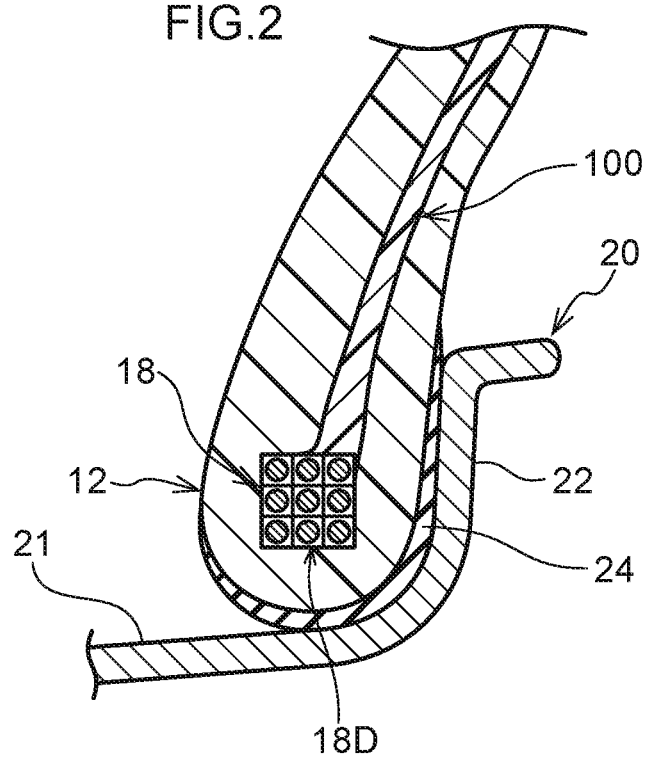
FIG. 2 is an enlargement of a portion in FIG. 1 indicated by arrow 2X, illustrating a rim assembly state of a tire according to the first exemplary embodiment.

As illustrated in FIG. 2, each of the bead sections 12 is a region that contacts a bead seat 21 and a rim flange 22 of a rim 20, and a seal layer 24, described later, is formed on the outer peripheral face of each of the bead sections 12.

As illustrated in FIG. 1, the side sections 14 configure side sections of the tire 10 and gently curve from the bead sections 12 to the crown section 16 so as to project out toward the tire width direction outside. Note that reference to the "tire width direction outside" indicates a side away from a tire equatorial plane CL along the tire width direction, and "tire width direction inside" indicates a side toward the tire equatorial plane CL along the tire width direction.

The crown section 16 is a region where the tire radial direction outside end of one of the side sections 14 couples to the tire radial direction outside end of the other of the side sections 14, and supports a tread 30 disposed at the tire radial direction outside. Note that the crown section 16 of the present exemplary embodiment has a flat profiled tire width direction intermediate portion, however the present invention is not limited thereto, and the crown section 16 may have a curved profile such that the tire width direction intermediate portion projects out to the tire radial direction outside.

Figure 3:
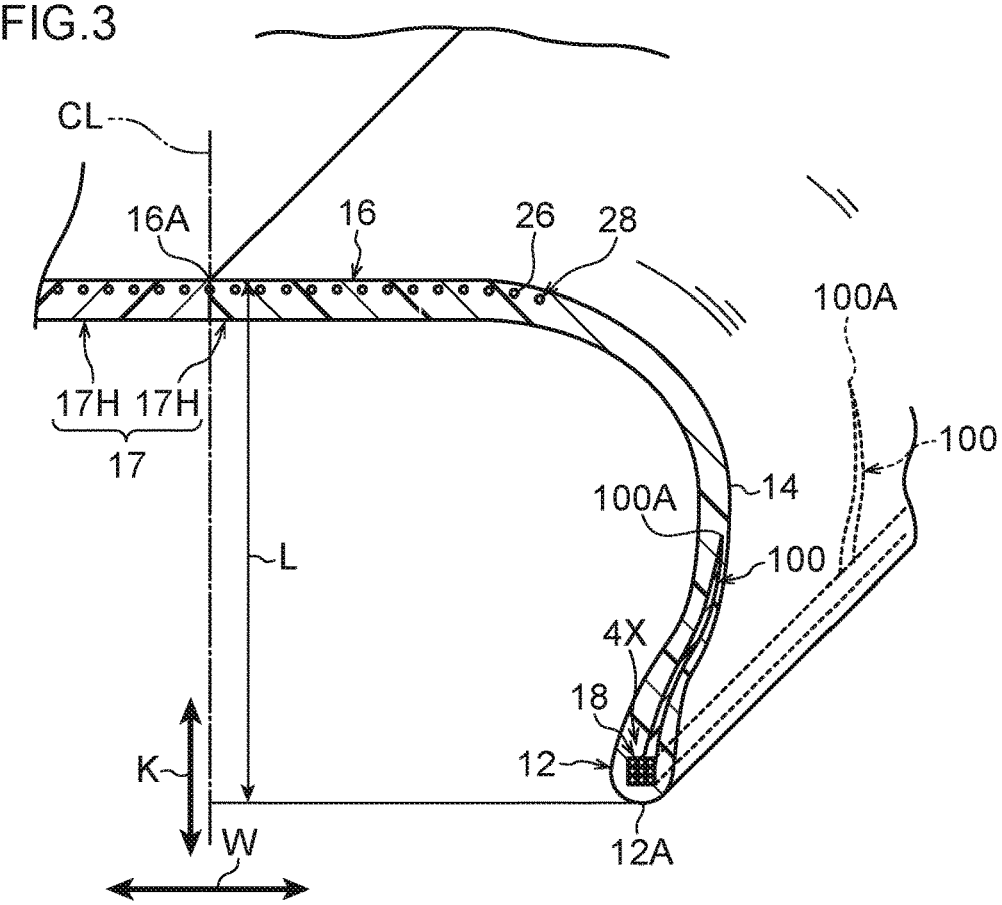
FIG. 3 is a perspective view illustrating a cross-section of a tire case of the first exemplary embodiment, taken along the tire width direction.

As illustrated in FIG. 3, taking L as a distance (distance measured along the tire radial direction) from tire radial direction inside ends 12A of the bead sections 12 to tire radial direction outside ends 16A of the crown section 16, then, with respect to the tire radial direction inside ends 12A, the bead sections 12 are located within a range of L/4 from the tire radial direction inside ends 12A toward the tire radial direction outside. Moreover, with respect to the tire radial direction outside ends 16A, the crown section 16 is located within a range of L/4 from the tire radial direction outside ends 16A toward the tire radial direction inside. Note that the side sections 14 are located between the bead sections 12 and the crown section 16.

In the present exemplary embodiment, the tire radial direction outside ends 16A of the crown section 16 are disposed on the tire equatorial plane CL.

The tire case 17 of the present exemplary embodiment is formed from a single resin material. As illustrated in FIG. 1, a pair of circular ring shaped tire half bodies 17H are each formed including one of the bead sections 12, one of the side sections 14, and half the width of the crown section 16. The tire case 17 is formed by aligning the ring shaped tire half bodies 17H against each other and joining together at tire equatorial plane portions thereof. Note that the present invention is not limited to such a joint structure, and other joint structures may be employed. For example, each region of the tire case 17 (the bead sections 12, the side sections 14, and the crown section 16) may be formed separately, then joined together as the tire case 17, or may be formed by integrating together adjacent regions (for example integrating together a bead section 12 and a side section 14), and the formed regions then joined to the remaining region as the tire case 17. Note that the tire case 17 may be formed with resin materials having different characteristics in each of the regions.

Moreover, the tire case 17 may be reinforced with reinforcement material by laying out and embedding reinforcement material (such as fibers of a polymer material or made from metal, cord, non-woven fabric, or cloth) in the tire case 17.

Examples of materials that may be employed as the resin material include thermosetting resins, thermoplastic resins, and thermoplastic elastomers (TPE). Note that the resin material does not include vulcanized rubber.

Examples of thermosetting resins include phenolic resins, urea resins, melamine resins, epoxy resins and polyamide resins.

Examples of thermoplastic resins include urethane resins, olefin resins, vinyl chloride resins, and polyamide resins.

Examples of thermoplastic elastomers include: amide based thermoplastic elastomers (TPA); ester based thermoplastic elastomers (TPC); olefin based thermoplastic elastomers (TPO); styrene based thermoplastic elastomers (TPS); urethane based thermoplastic elastomers (TPU); thermoplastic vulcanizates (TPV); and other thermoplastic elastomers (TPZ), as defined in JIS K6418. Note that preferably a thermoplastic elastomer is employed, in consideration of such factors as the resilience required during running, and the formability during manufacture.

Reference to the same type of resin material indicates, for example, both being ester based resin materials, or both being styrene resin materials.

As such resin materials, a material may for example be employed that has a deflection temperature under load (when applied with a load of 0.45 MPa) of 78° C. or above as defined in ISO 75-2 or ASTM D648, a tensile yield strength of 10 MPa or greater as defined in JIS K7113, a tensile yield elongation of 10% or greater as similarly defined in JIS K7113, a tensile elongation at break (JIS K7113) of 50% or greater as similarly defined in JIS K7113, and a Vicat softening temperature (method A) of 130° C. or above as defined in JIS K7206.

In the present exemplary embodiment, the frame resin material that forms the tire case 17 is a thermoplastic material that exhibits thermo-plasticity (for example a thermoplastic resin material or a thermoplastic elastomer).

In the present exemplary embodiment, the tire half bodies 17H have left-right symmetry, namely one of the tire half bodies 17H is formed in the same shape as the other tire half body 17H, with the advantage that one type of mold suffices for forming the tire half bodies 17H.

Figure 4:
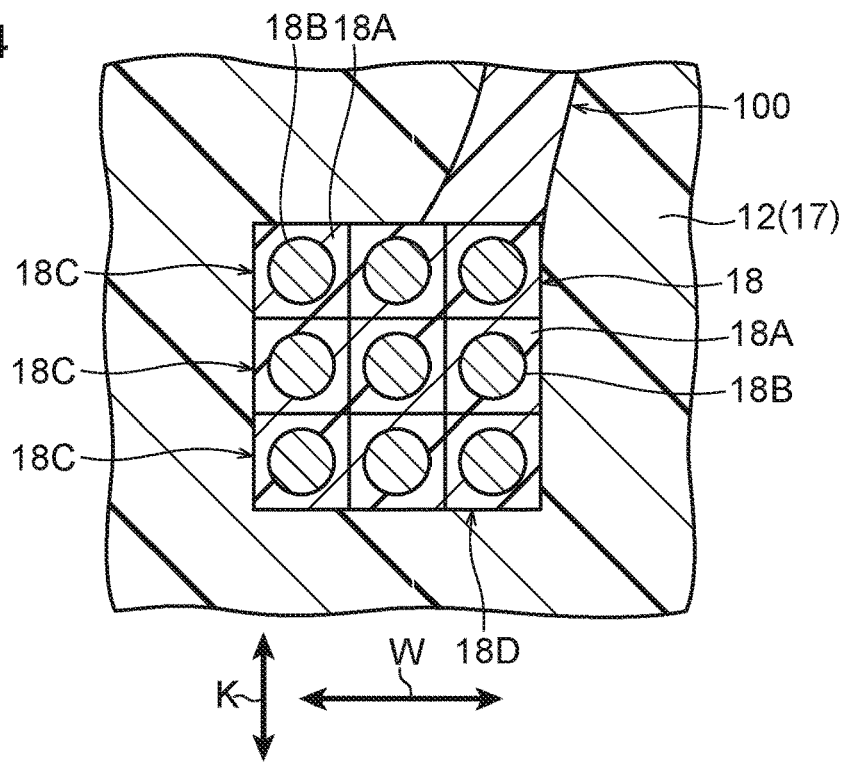
FIG. 4 is an enlargement of a portion in FIG. 3 indicated by arrow 4X.

As illustrated in FIG. 4, a covered bead core 18 (an example of a bead core of the present invention) that is formed in a circular ring shape extending around the tire circumferential direction is embedded in the bead sections 12. The covered bead core 18 is formed by cover-joining a resin material employed for covering (referred to below as a "covering resin material") onto a single strand, or plural strands, of bead cords 18B. In other words, the outer periphery of the single strand, or plural strands, of the bead cords 18B is covered with a covering layer 18A formed of the covering resin material, and the outer periphery of the bead cords 18B and the covering layer 18A are joined together.

The covered bead core 18 and the bead sections 12 are also joined together. In other words, the covering layers 18A of the covered bead core 18 are joined to each of the bead sections 12.

Detailed explanation next follows regarding the covered bead core 18.

The covered bead core 18 of the present exemplary embodiment is formed by taking one strand of the bead cord 18B, that is covered with the covering layer 18A formed from the covering resin material and joined to the covering layer 18A, winding it plural times in the tire circumferential direction, and joining it to the covering layer 18A of the adjacent bead cord 18B. More specifically, the covered bead core 18 is wound plural times along the tire circumferential direction so as to form parallel rows along the tire width direction of the bead cords 18B that are covered by the covering layers 18A and joined to the covering layers 18A, the covering layers 18A of the adjacent bead cord 18B are joined to form a bead core row 18C, and the covered bead core 18 is formed by forming plural layers of such bead core rows 18C either to the tire radial direction outside or inside. Note that the covering layers 18A of the bead cord 18B adjacent to each other in the tire radial direction are also joined together. A resin layer 18D of the covering resin material configures the outer layer portion of the covered bead core 18 formed in this manner.

Joining together the covering layers 18A of the adjacent bead cords 18B may be performed using a bonding agent, by welding, or by another method.

Note that in the present exemplary embodiment, the covering layers 18A of the adjacent bead cords 18B are joined together by welding.

As the bead cords 18B, a monofilament (single strand) such as of metal fiber or organic fiber may be employed, or a multifilament (twisted strands) of twisted metal fiber or organic fiber may be employed. A steel fiber may, for example, be employed as the metal fiber, and an aromatic polyamide fiber or a nylon fiber may, for example, be employed as the organic fiber. Note that the above fiber is not limited to being a metal fiber or an organic fiber.

In the present exemplary embodiment a steel monofilament is employed as the bead cords 18B.

A bonding agent (for example a silane coupling agent) may be employed to join together the covering layers 18A formed with the covering resin material and the bead cords 18B. There is accordingly a bonding layer (not illustrated in the drawings) formed in the present exemplary embodiment between the bead cords 18B and the covering layers 18A, this being a layer configured by the bonding agent.

Note that in the present exemplary embodiment, the bead cords 18B and the covering layers 18A are joined together with a bonding agent, however the present invention is not limited to such a joint structure, and joining may be accomplished with another joint structure that does not join with a bonding agent, as long as sufficient joint strength is obtained. For example, bead cords 18B that have been surface roughened to form fine undulations may be coated in a molten-state covering resin material, and the covering layers 18A formed by the covering resin material setting in a state penetrating into the fine undulations. A joint structure may be employed in which the bead cords 18B and the covering layers 18A are joined by utilizing the anchor effect of the covering resin material that has penetrated into the fine undulations.

In the present exemplary embodiment, the covering resin material that forms the covering layers 18A is formed with a thermoplastic material that exhibits thermo-plasticity (for example a thermoplastic resin or a thermoplastic elastomer).

Moreover, the covered bead core 18 and each of the bead sections 12 are joined together by welding. More specifically, the resin layer 18D of the covered bead core 18 (the collective body of the covering layers 18A) and each of the bead sections 12 are joined together by welding. Note that the present invention is not limited to such a joint structure, and joining may achieved using another joint structure without joining by welding. For example, the resin layer 18D and the bead section 12 may be joined by a bonding agent, or the surface (the surface of the resin layer 18D) of the covered bead core 18 may be roughened to form fine undulations, the covered bead core 18 covered with molten-state frame resin material, and the bead sections 12 formed with a solidified state of frame resin material penetrating into the fine undulations, so as to employ a joint structure in which the covered bead core 18 and the bead section 12 are joined together utilizing the anchor effect of the frame resin material that has penetrated into the fine undulations.

Detailed explanation next follows regarding an extension portion 100.

As illustrated in FIG. 1 and FIG. 3, the extension portion 100 is formed to the covered bead core 18 so as to extend from the covered bead core 18 in a direction that intersects with the tire circumferential direction, as viewed from a tire side face (in other words, as viewed from the tire width direction).

More specifically, the extension portion 100 extends from the resin layer 18D of the covered bead core 18 toward the tire radial direction outside. The extension portion 100 of the present exemplary embodiment is integrally formed to the covering layers 18A from the same material as the covering resin material forming the covering layers 18A. Namely, the extension portion 100 is formed by a part of the covering resin material forming the resin layer 18D of the covered bead core 18, extending out toward the tire radial direction outside.

The extension portion 100 of the present exemplary embodiment extends out from the resin layer 18D toward the tire radial direction outside, however the present invention is not limited to such a configuration, and the extension portion 100 may extend from the resin layer 18D in any direction as long as the other direction intersects with the tire circumferential direction.

Moreover, although in the present exemplary embodiment the extension portion 100 is formed from the same material as the covering resin material for forming the covering layers 18A, the present invention is not limited to such a configuration, and the extension portion 100 may be formed from a different material to the covering resin material for forming the covering layers 18A.

The extension portion 100 is joined to the tire case 17. More specifically, the extension portion 100 and the tire case 17 are joined together by welding. Note that the present invention is not limited to such a joint structure, and another joint structure not joined by welding may be employed. For example, the extension portion 100 and the tire case 17 may be joined together by a bonding agent, or the surface of the extension portion 100 may be roughened to form fine undulations, the extension portion 100 covered with molten-state frame resin material, and the tire half body 17H formed with solidified frame resin material in a state penetrated into the fine undulations, so as to employ a joint structure in which the extension portion 100 and the tire half body 17H are joined together utilizing the anchor effect of the frame resin material that has penetrated into the fine undulations.

The extension portions 100 extend toward the tire radial direction outside and are inserted into the side sections 14. More specifically, a leading end portion 100A of each of the extension portions 100 reaches as far as a tire radial direction intermediate portion of the side section 14. The extension portion 100 of the present exemplary embodiment is, as illustrated in FIG. 3, formed with a shape with a width that gradually becomes narrower on progression from the plural covered bead cores 18 toward the leading end portion 100A. Note that the present invention is not limited to such a configuration, and the shape of the extension portions 100 may be a shape that has a constant width, or a shape that gradually widens, from the plural covered bead cores 18 toward the leading end portion 100A, or a shape other than these.

Plural of the extension portions 100 are formed at intervals around the tire circumferential direction. Note that although in the present exemplary embodiment the extension portions 100 are formed at even intervals around the tire circumferential direction, the present invention is not limited to such a configuration, and the extension portions 100 may be formed so as not to be disposed at even intervals around the tire circumferential direction.

As illustrated in FIG. 2, the seal layer 24, that is formed in a circular ring shape from a soft material that is softer than the frame resin material forming the tire case 17, is formed at the outer peripheral face of the bead section 12 at contact portions with the rim 20 (the portion that contacts the bead seat 21 and the portion that contacts the rim flange 22). Note that the seal layer 24 may be omitted from portions that contact the rim flange 22. The soft material for forming the seal layer 24 serves as an example of a resilient body and is preferably a rubber. Another type of resin material that is softer than the frame resin material forming the tire case 17 may be employed as the soft material.

As illustrated in FIG. 1 and FIG. 3, reinforcement cords 26 are embedded in an outer peripheral portion of the tire case 17. The reinforcement cords 26 form a reinforcement layer 28 wound in the circumferential direction.
Moreover, the tread 30 that contacts the road surface is provided on the outer peripheral face of the tire case 17. The tread 30 is joined to the tire case 17. A tread pattern (not illustrated in the drawings) including plural grooves 30A is formed in the tread 30.

Figure 5:
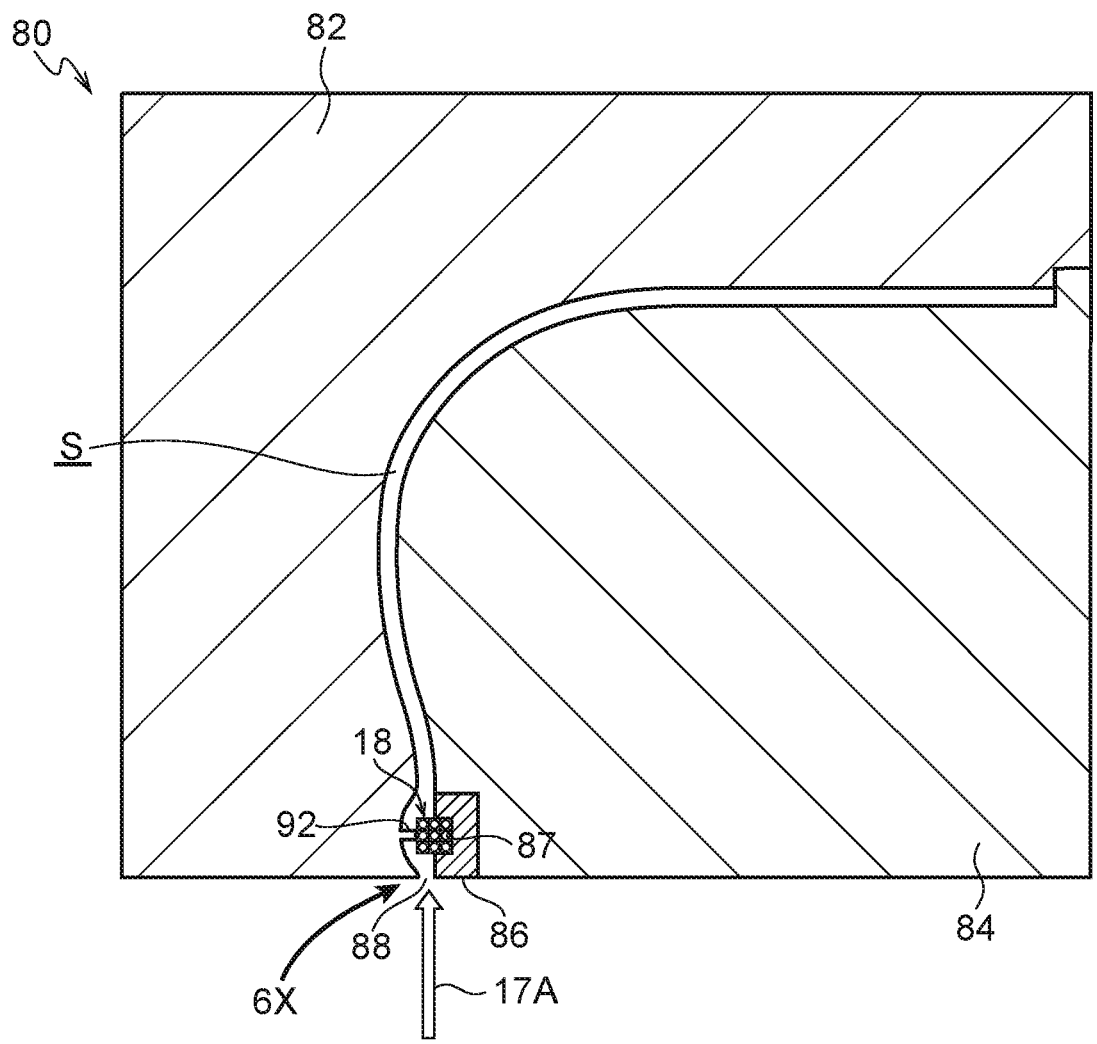
FIG. 5 is a plan view cross-section of a mold employed to form a tire half body of the first exemplary embodiment, illustrating the mold in a state in which a covered bead core has been laid out in the mold.

Tire Manufacturing Machine
Explanation next follows regarding a manufacturing machine of the tire 10 of the present exemplary embodiment, with reference to FIG. 5 to FIG. 12.
Explanation first follows regarding a mold 80 for forming the tire half body 17H.
As illustrated in FIG. 5, the mold 80 includes an outer mold 82 for forming the tire outer face side, and an inner mold 84 for forming the tire inner face side, so as to enable the tire half body 17H to be formed. A main jig 86 for use in covered bead fixing is provided to the inner mold 84. A cavity S (space) with the tire half body 17H shape is formed between the outer mold 82 and the inner mold 84.

The main jig 86 is, for example, disposed (for example in 12 individual locations) at uniform intervals around the housing position of the covered bead core 18. The main jig 86 is formed with a recess 87 corresponding to the external profile of the covered bead core 18, described later, and when the covered bead core 18 is disposed in the mold 80, part of the covered bead core 18 is retained by the recesses 87. The covered bead core 18 is thereby in a state in which movement toward the tire inside direction is restricted and movement in the up-down direction (the tire radial direction) is restricted.

A gate (resin pouring path) 88 of the mold 80 is formed such that molten-state frame resin material 17A passes by to the tire outside of the covered bead core 18 in a state in which the covered bead core 18 is inserted into the recesses 87.

The gate 88 is a disk gate opening in a ring shape, and the cavity S is formed in communication with the ring shaped gate 88 so as to spread out in a hollow circular disk shape. Note that the gate 88 may be configured as a pin gate, however a disk gate is preferable from the viewpoint of molding performance.

Figure 6:
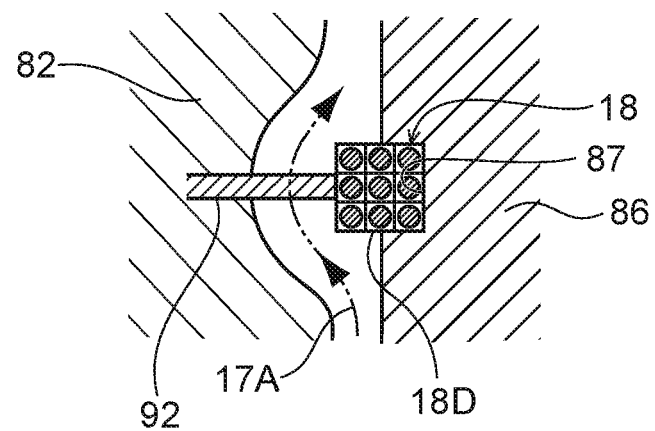
FIG. 6 is an enlargement of a portion in FIG. 5 indicated by arrow 6X.
Figure 7:
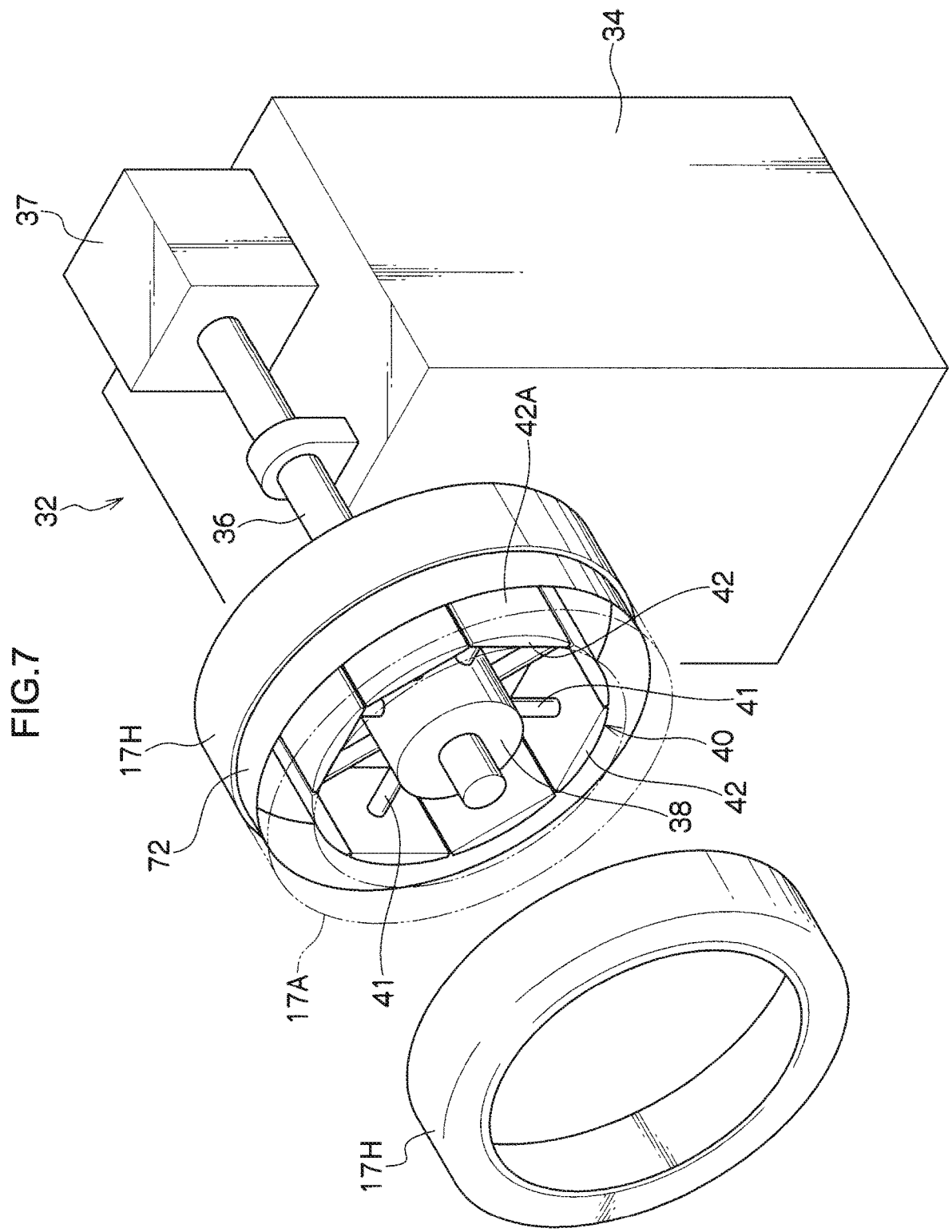
FIG. 7 is a perspective view of a forming machine employed to form a tire case of the first exemplary embodiment.

In the present exemplary embodiment, as illustrated in FIG. 6, the covered bead core 18 is placed at a specific position in the mold 80, and the molten-state frame resin material 17A poured in to form the tire half body 17H (see FIG. 3 and FIG. 7).

Explanation next follows regarding a manufacturing machine for joining together the tire half bodies 17H to form the tire case 17. As illustrated in FIG. 7, a forming machine 32 employed to form the tire 10 includes a geared motor 37 that is attached to an upper portion of a stand 34 contacting the floor, and that rotates a horizontal oriented shaft 36. A tire support section 40 is provided to the leading end side of the shaft 36. The tire support section 40 is equipped with a cylinder block 38 fixed to the shaft 36, with plural cylinder rods 41 provided to the cylinder block 38 at even intervals in the circumferential direction so as to extend out toward the radial direction outside. Tire support flanges 42, provided to the respective leading ends of the plural cylinder rods 41, have circular arc curved faces 42A set with outer faces that have substantially the same radius of curvature as the tire inner face.

Figure 8:
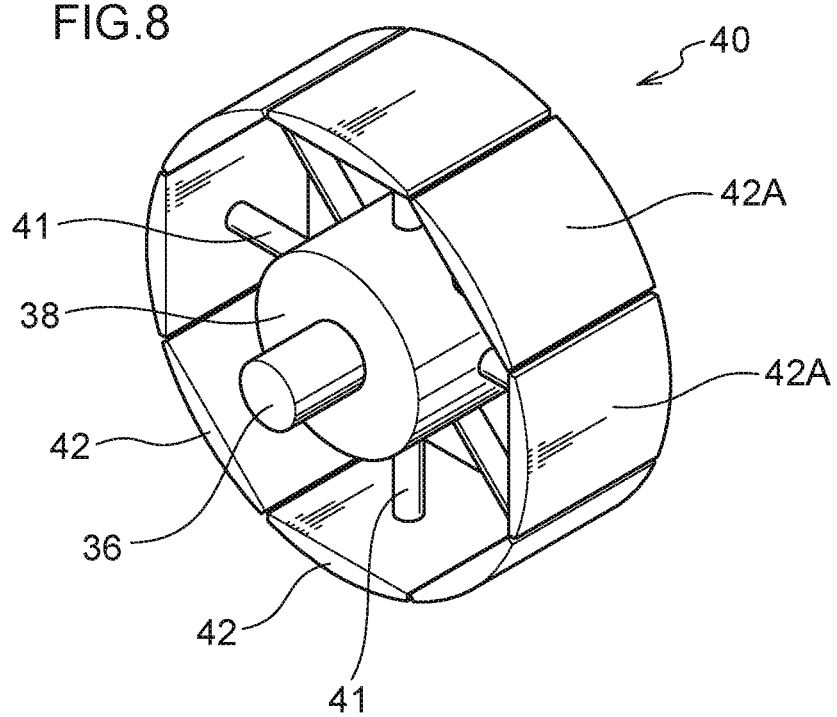
FIG. 8 is a perspective view of a tire support section employed to form a tire case of the first exemplary embodiment, illustrating the tire support section in its minimum diameter state.
Figure 9:
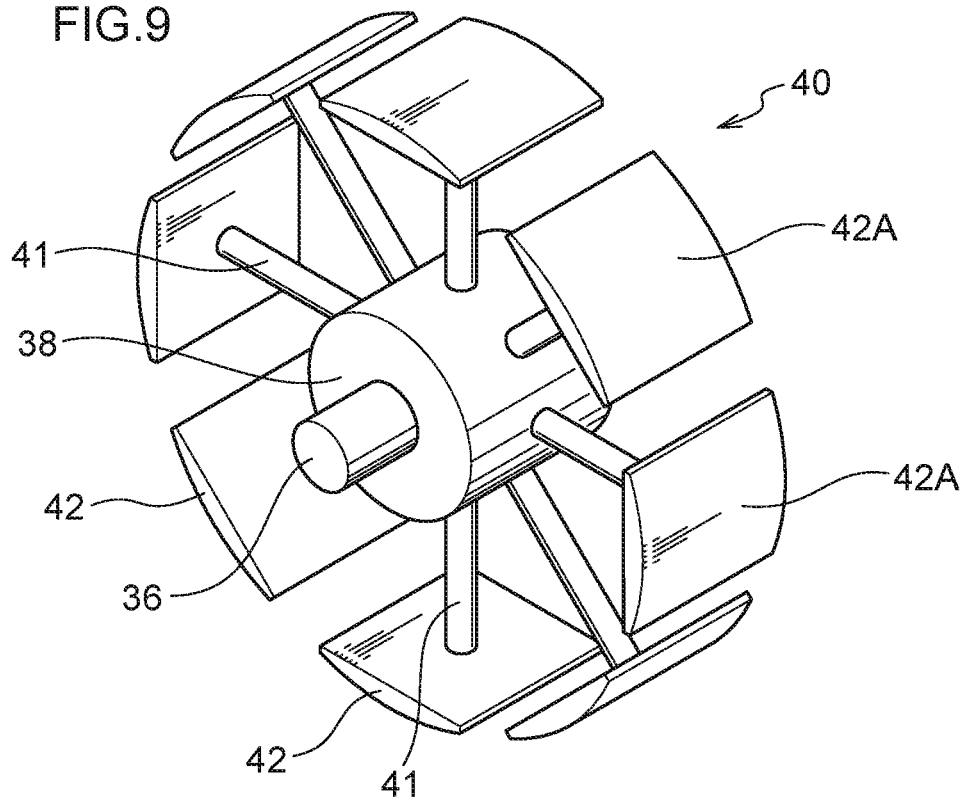
FIG. 9 is a perspective view of a tire support section employed to form a tire case of the first exemplary embodiment, illustrating the tire support section in its maximum diameter state.

FIG. 8 illustrates a minimum protrusion state of the cylinder rods 41 (the tire support section 40 in its minimum diameter state), and FIG. 9 illustrates a maximum protrusion state of the cylinder rods 41 (the tire support section 40 in its maximum diameter state). The cylinder rods 41 are each interlinked together so as to be capable of moving by the same amount as each other in the same direction.

Figure 11:
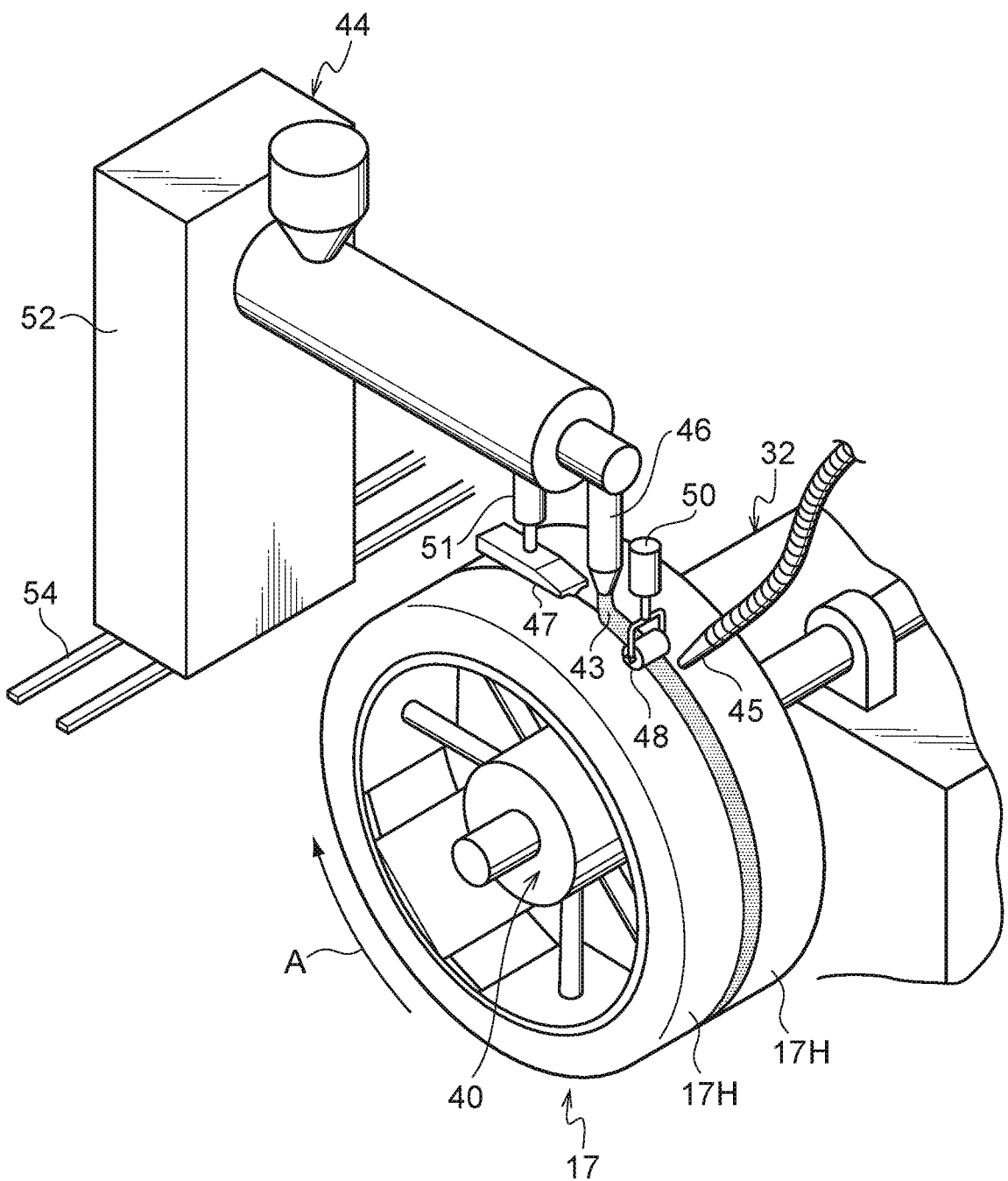
FIG. 11 is a perspective view to explain a process to join tire half bodies of the first exemplary embodiment, and illustrates a forming machine, and an extruder that supplies molten resin material.

As illustrated in FIG. 11, an extruder 44 that extrudes a welding resin material 43 is disposed in the vicinity of the forming machine 32. The extruder 44 is equipped with a resin ejection nozzle 46 that ejects the molten welding resin material 43 downward. As the welding resin material 43, preferably a material is employed that has a Young's modulus in the range of 0.1 to 10 times that of the frame resin material. In the present exemplary embodiment, the welding resin material 43 is the same material as the frame resin material forming the tire case 17. Note that the present invention is not limited so such a configuration, and the welding resin material 43 may employ a different material to the frame resin material.

A flattening roller 48 to press the welding resin material 43 applied to the tire outer face, and a cylinder device 50 to move the flattening roller 48 up and down, are disposed in the vicinity of the resin ejection nozzle 46, on the rotation direction downstream side of the tire case 17 (the arrow A direction side). The cylinder device 50 is supported through a frame, not illustrated in the drawings, by a support column 52 of the extruder 44. In the present exemplary embodiment, the flattening roller 48 has cooling water circulating inside the roller, and is cooled by the cooling water.

A cooling air jet nozzle 45 that jets cooling air is disposed at the tire case rotation direction downstream side of the flattening roller 48.

A heating iron 47 (see FIG. 11) is disposed on the opposite side of the resin ejection nozzle 46 to the tire case rotation direction side (the opposite direction side to that of the arrow A direction). The heating iron 47 is capable of heating to a temperature equal to the melting point of the welding resin material 43, or higher.

As illustrated in FIG. 11, a cylinder device 51 is disposed above the heating iron 47 to move the heating iron 47 in the up-down direction. The cylinder device 51 is supported through a frame, not illustrated in the drawings, by the support column 52 of the extruder 44. Note that the extruder 44 is capable of moving in a horizontal direction along guide rails 54 laid out on the floor, in a direction parallel to the shaft 36 of the forming machine 32.

Figure 12:
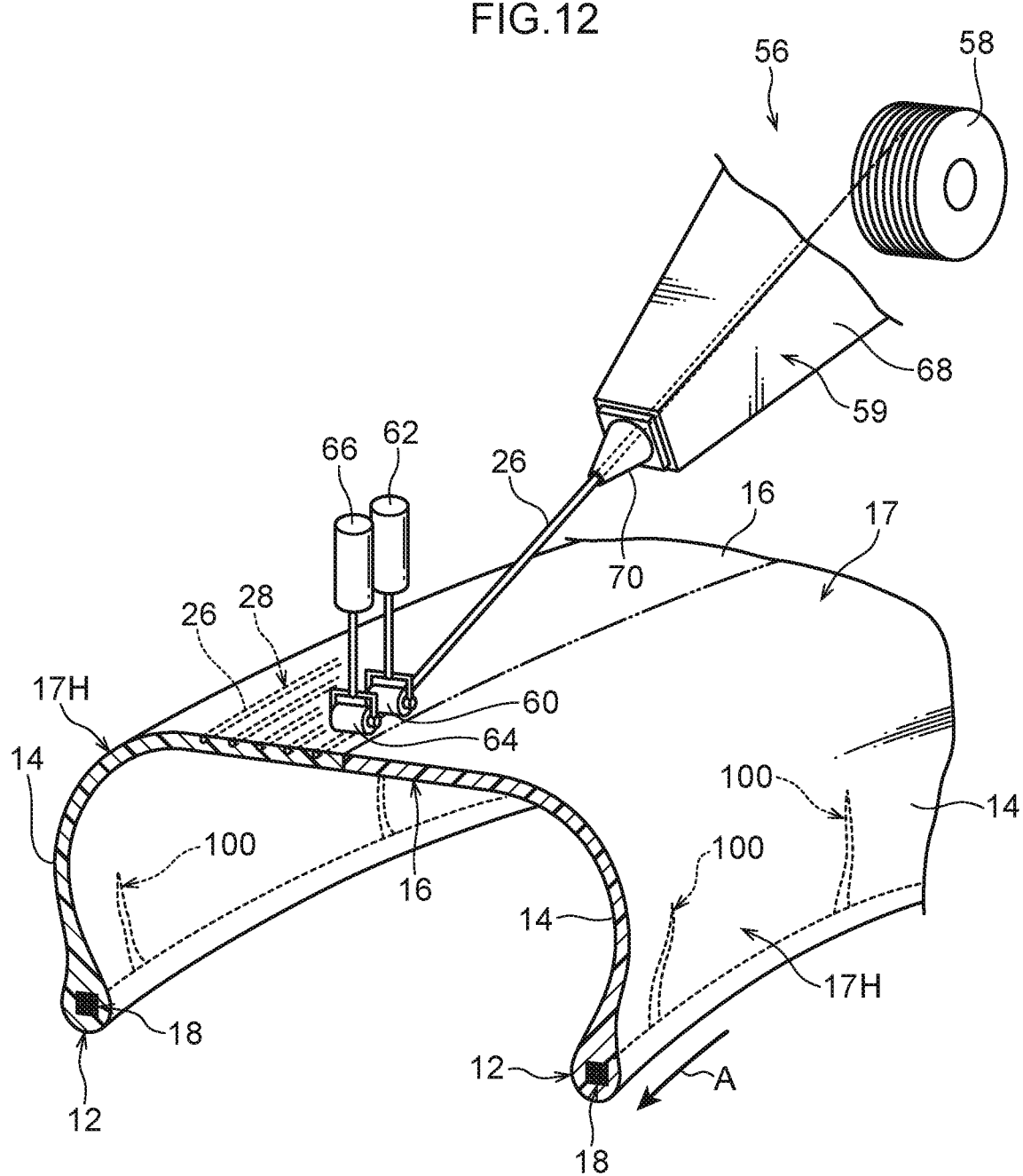
FIG. 12 is a perspective view to explain a process to embed a reinforcement cord in an outer peripheral portion of a tire case of the first exemplary embodiment, and illustrates relevant portions of a cord supply device that supplies reinforcement cord.

A cord supply device 56 such as that illustrated in FIG. 12, equipped with a reel 58, a cord heating device 59, and the like, is movably installed to the guide rails 54.

The cord supply device 56 is equipped with: the reel 58 wound with reinforcement cord 26; the cord heating device 59 disposed at the cord conveying direction downstream side of the reel 58; a first roller 60 disposed at the reinforcement cord 26 conveying direction downstream side; a first cylinder device 62 to move the first roller 60 so as to move towards, or away from, the tire outer peripheral face; a second roller 64 disposed at the reinforcement cord 26 conveying direction downstream side of the first roller 60; and a second cylinder device 66 to move the second roller 64, so as to move towards, or away from, the tire outer peripheral face. Note that the cord supply device 56 may be provided to either the first roller 60 or the second roller 64. The cord heating device 59 is equipped with a heater, not illustrated in the drawings, that generates hot air, a fan, a heating box 68 that is supplied inside with hot air and through which the reinforcement cord 26 passes, and a dispenser 70 that dispenses the heated reinforcement cord 26.

Tire Manufacturing Method

Explanation next follows regarding an example of a tire manufacturing method of the tire 10 of the present exemplary embodiment, based on procedures (1) to (7).

Covered Bead Core Forming Process (1) Explanation follows regarding a forming process of the covered bead core 18.

First the bead cord 18B is degreased. Then a bonding agent (for example a silane coupling agent) is applied to the outer periphery of the bead cord 18B. Note that application of the bonding agent may be by spray application of the bonding agent to the outer periphery of the bead cord 18B, or may be application of the bonding agent to the outer periphery by immersing the bead cord 18B in a tank of bonding agent.

The bead cord 18B is then passed through inside an extruder (not illustrated in the drawings) and the outer periphery of the bead cord 18B is covered with molten covering resin material. The bead cord 18B extruded from the outlet of the extruder is covered with the covering resin material formed into the profile of the outlet of the extruder (a rectangular shape in the present exemplary embodiment) (see FIG. 13).

The covering resin material that covers the bead cord 18B solidifies by cooling naturally, or is force cooled, such as by using a jet of cooling air or by passing through a water tank, so as to solidify and form the covering layer 18A. As the covering resin material solidifies, the bead cord 18B and the covering layer 18A are joined together by the bonding agent.

Figure 14:
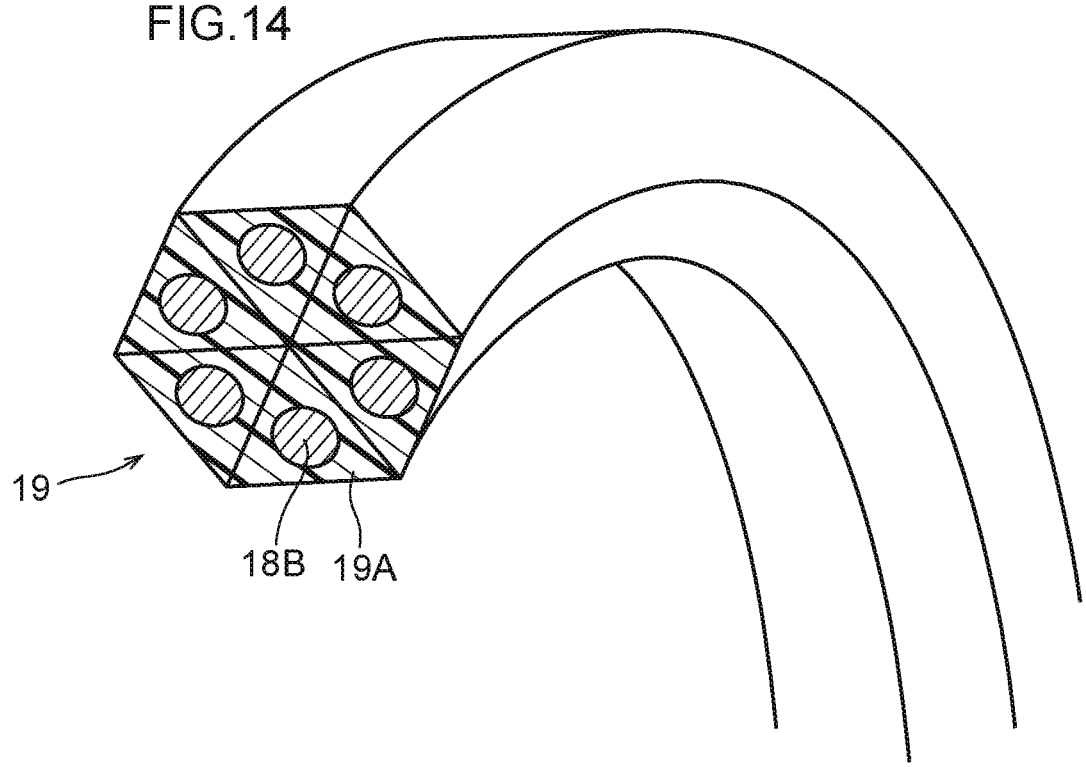
FIG. 14 is a cross-section within a perspective view to illustrate the cross-section of a resin-covered bead cord of a modified example of a covered bead core of the first exemplary embodiment.

Note that in the present exemplary embodiment, the outlet profile of the extruder is a rectangular profile, however the present invention is not limited to such a configuration, and the outlet profile of the extruder may be any shape. For example, the outlet profile of the extruder may be a circular profile, a triangular profile, a polygonal profile with beveled or rounded corners, or the like. Note that when the outlet profile of the extruder is a triangular profile, the covering layer 18A is formed with a triangular profiled cross-section (see FIG. 14). FIG. 14 illustrates a covered bead core 19 that is a modified example of the covered bead core 18. The covered bead core 19 has triangular profiled cross-sections of covering layers 19A formed from a covering resin material, and is formed with an overall hexagonal shaped cross-section profile.

In the present exemplary embodiment, the bead cord 18B is degreased before coating with the bonding agent, however degreasing may be omitted as long as sufficient joint structure can be ensured between the bead cord 18B and the covering resin material (the covering layer 18A).

Figure 13:
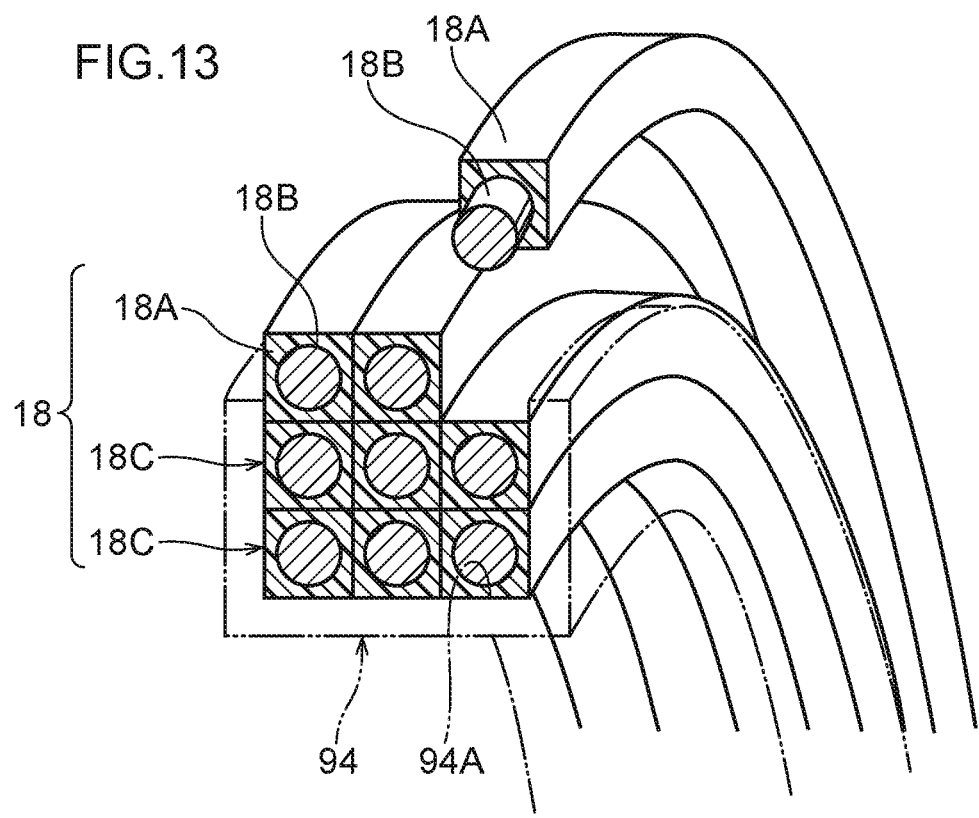
FIG. 13 is a cross-section within a perspective view to explain a process to form a covered bead core of the first exemplary embodiment, and illustrates cross-section of a resin-covered bead cord.

Then, as illustrated in FIG. 13, while winding one strand of the bead cord 18B covered in the covering layer 18A plural times onto a winding jig 94, adjacent bead cords 18B are joined together by welding together their respective covering layers 18A. More specifically, the bead cord 18B wound plural times into a housing portion 94A of the winding jig 94 forms a first row bead core row 18C, and then the bead cord 18B wound plural times onto the first row bead core row 18C forms a second bead core row 18C. When doing so, the respective covering layers 18A of the bead cords 18B that overlap in the up-down direction are joined together by welding. The plural bead core rows 18C are overlapped with each other (layered) in this manner to form the covered bead core 18.

The welding together of the respective covering layers 18A of the adjacent bead cords 18B is performed by pre-melting the surfaces of the covering layers 18A prior to winding the adjacent bead cords 18B onto the winding jig 94. Examples of the method for melting the surfaces of the covering layers 18A include blowing hot air onto them, heating with radiant heat, or by pressing with a hot iron. Moreover the surfaces of the covering layers 18A of the bead cords 18B already wound onto the winding jig 94 may also be melted, so as to weld together the covering layers 18A of the adjacent bead cords 18B.

Note that the surfaces of the covering layers 18A of the wound bead cords 18B may also be melted while melting the surfaces of the covering layers 18A of the bead cords 18B prior to winding, so as to weld together the covering layers 18A of the adjacent bead cords 18B.

Forming the covered bead core 18 as described above fills the spaces between the adjacent covered bead cores 18 with covering resin material without leaving any gaps. Movement of the bead cords 18B is thereby constrained by the covering resin material.

Tire Half Body Forming Process (2) Explanation follows regarding the tire half body forming process.

First, the mold 80 is opened, the tire inside portion of the thus formed covered bead core 18 inserted into the recesses 87 of the main jig 86 such that the covered bead core 18 is retained in the main jig 86. The mold 80 is then closed, leaving the covered bead core 18 supported from the tire outside by auxiliary jig 92.

Then injection molding is performed by pouring the molten-state frame resin material 17A into the mold 80 through the gate 88 to form the tire half body 17H. During the injection molding, the molten-state frame resin material 17A is poured so as to pass through the gate 88 and between the covered bead core 18 and the outer mold 82 at the locations where the main jig 86 is provided, thereby pressing the covered bead core 18 from the tire outside towards the tire inside. This thereby enables movement force received by the covered bead core 18 to be sufficiently supported by the main jig 86.

In the present exemplary embodiment, the frame resin material for forming the tire case 17 is melted to a higher temperature than the melting point of the covering resin material for forming the resin layer 18D (the collective body of the covering layers 18A) and poured into the cavity S. During pouring of the molten-state frame resin material 17A through the gate 88 and into the space between the covered bead core 18 and the outer mold 82, the surface of the resin layer 18D is melted by heat from the molten-state frame resin material 17A, and the melted covering resin material flows together with the molten-state frame resin material 17A toward the far side of the cavity S. Solidification of the molten-state frame resin material 17A and the melted covering resin material forms the tire half body 17H, and also forms the extension portion 100 with the covering resin material that has flowed from the resin layer 18D toward the far side of the cavity S. At this stage the tire half body 17H and the resin layer 18D (the covered bead core 18), and the tire half body 17H and the extension portion 100, are respectively joined to each other by welding.

Note that each of the extension portions 100 is formed along the flow of the molten-state frame resin material 17A, namely the extension portion 100 is formed along the injection (pouring) direction of the molten-state frame resin material through the gate 88. The thus formed extension portions 100 are thereby disposed at intervals around the tire circumferential direction.

Note that the position reached by the leading end portion 100A of each of the extension portions 100 can be adjusted according to the melting temperature of the frame resin material, and the injection (pouring) pressure into the cavity. In another exemplary embodiment of the present invention, a mold structure may be adopted in which it is possible to advance, or withdraw, the auxiliary jig 92 in the cavity S, such that pouring of the molten-state frame resin material 17A can continue as the auxiliary jig 92 is being withdrawn. This thereby enables new molten-state frame resin material 17A to be poured in before the initially poured molten-state frame resin material 17A has solidified too much. Thus the bead sections 12 can be formed by flowing molten-state frame resin material into the locations previously contacted by the auxiliary jig 92.

Moreover, by similarly making the main jig 86 capable of being advanced, or withdrawn, the bead sections 12 can be formed by flowing molten-state frame resin material 17A into the locations where the main jig 86 previously made contact. In such cases, the timing for withdrawing the auxiliary jig 92 and the main jig 86 from the covered bead core 18 may be pre-determined based on the dimensions of the cavity S, and the temperature of the molten-state frame resin material 17A for pouring into the cavity S, with this thereby obviating the need to detect such factors as the solidification state of the poured molten-state frame resin material 17A.

Moreover, the molten resin may be poured without employing the auxiliary jig 92 in cases in which displacement of the covered bead core 18 during pouring of the molten-state frame resin material can be sufficiently prevented by retaining the covered bead core 18 with the main jig 86. A configuration may also be adopted in which the main jig 86 makes contact from the tire outside, instead of from the tire inside.

Tire Case Forming Process (3) Explanation follows regarding the tire case forming process.

As illustrated in FIG. 7, first, two tire half bodies 17H are aligned with each other on the outer peripheral side of the tire support section 40 in its reduced diameter configuration, and a tire-inner-face support ring 72 formed in a cylindrical shape from a thin metal plate (for example a steel plate of 0.5 mm thickness) is placed inside the two tire half bodies 17H (note that in FIG. 7 one of the tire half bodies 17H is removed in the illustration to enable the inside to be seen). In the present exemplary embodiment, during mutual alignment and placement of the two tire half bodies 17H, the edge portion of one of the tire half bodies 17H is abutted with the edge portion of the other of the tire half bodies 17H, however a slight gap may be left therebetween.

The external diameter of the tire-inner-face support ring 72 is set as substantially the same dimension as the internal diameter of the outer peripheral portion of the tire half bodies 17H, such that the outer peripheral face of the tire-inner-face support ring 72 is in close contact with the inner peripheral face of the outer peripheral portion of the tire half bodies 17H. A ring shaped groove 72A is formed to the outer peripheral face of the tire-inner-face support ring 72, so as to extend continuously around the circumferential direction at a width direction central portion of the tire-inner-face support ring 72. The tire-inner-face support ring 72 is easily insertable inside the tire half bodies 17H by bending deformation due to being formed from a thin metal plate.

Figure 10:
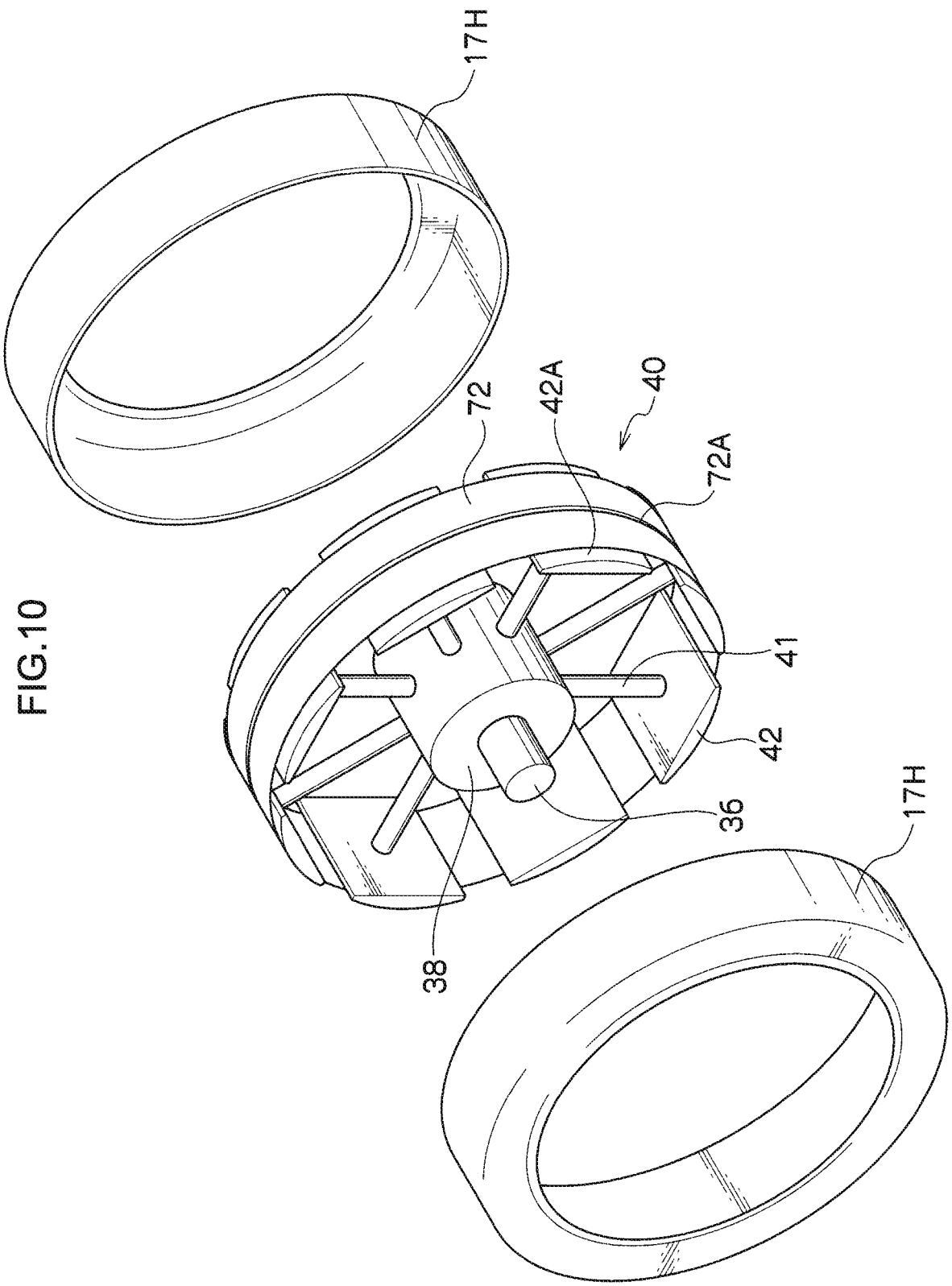
FIG. 10 is a perspective view of a tire support section for supporting a tire half body and a tire inner face support ring of the first exemplary embodiment.

Then, as illustrated in FIG. 10, the diameter of the tire support section 40 is increased, and the plural tire support flanges 42 caused to contact the inner peripheral face of the tire-inner-face support ring 72, such that the tire-inner-face support ring 72 is held from the inside by the plural tire support flanges 42 (in FIG. 10, both of the tire half bodies 17H are removed in the illustration to enable the inside to be seen). Supporting the two tire half bodies 17H aligned with each other in this manner enables the edge portions of the tire half bodies 17H on the tire equatorial plane side to be aligned with good precision around the entire circumference.

Next, the extruder 44 is moved, and as illustrated in FIG. 11, the abutting portion of the two tire half bodies 17H (the tire equatorial plane CL of the tire case 17) is disposed under the heating iron 47, the resin ejection nozzle 46, the flattening roller 48, and the cooling air jet nozzle 45.

Then, the heating iron 47 and the flattening roller 48 are lowered. At this point the heating iron 47 presses against the outer periphery of the abutting portion of the two tire half bodies 17H. As the tire case 17 supported by the tire support section 40 is revolved in the arrow A direction, the portions pressing against the heating iron 47, namely the edge portion of the one tire half body 17H and the edge portion of the other tire half body 17H, are sequentially melted, thereby sequentially completely melting the edge portions together, so there is no boundary therebetween.

By rotating the tire support section 40, the melted portion moves to the rotation direction downstream side (the arrow A direction side), and molten-state welding resin material 43 extruded from the resin ejection nozzle 46 is sequentially supplied (in-filled) into an indented portion on the tire outer face side at the weld portion. The melted portion of the tire case 17 and the melted welding resin material 43 are thereby welded together, so as to completely eliminate the indented portion at the weld portion, and to form a slight projecting portion of the melted welding resin material 43 on the tire outer face side. The molten-state welding resin material 43 is then sequentially pressed by the flattening roller 48 from the radial direction outside toward the radial direction inside, such that the surface is uniformly flattened to substantially flat. Note that preferably the joining locations of the tire half bodies 17H are cleaned with a cleaner such as alcohol prior to joining. Treatment such as corona treatment or ultraviolet treatment may also be performed on the joining locations of the tire half bodies 17H prior to joining so as to facilitate adhesion of the welding resin material 43.

The welding resin material 43 that has been applied to the tire half bodies 17H then solidifies, so as to tightly join one of the tire half bodies 17H to the other of the tire half bodies 17H, to obtain the tire case 17 in which the two tire half bodies 17H have been completely integrated together. Note that the in-fill amount of the welding resin material 43 may be adjusted such that the welding resin material 43 does not protrude, or the surface of projecting welding resin material 43 may be ground away, so that the surface of the welding resin material 43 is in the same plane as the surface of the tire case 17.

In the present exemplary embodiment, the water-cooled flattening roller 48 is placed in contact with the weld portion, and the cooling air jetted from the cooling air jet nozzle 45 is directed onto the weld portion, thereby rapidly cooling and solidifying the weld portion. Note that the weld portion may also be solidified by natural cooling.

Reinforcement Layer Forming Process (4) Explanation follows regarding the reinforcement layer forming process.

As illustrated in FIG. 12, the tire case 17 is rotated in the arrow A direction, and the heated reinforcement cord 26 dispensed from the dispenser 70 of the cord supply device 56 is wound in a spiral pattern onto the outer peripheral face of the tire case 17, to form the reinforcement layer 28 of the crown section 16. Winding of the reinforcement cord 26 in a spiral pattern on the outer peripheral face of the tire case 17 may be accomplished by moving the cord supply device 56 in the tire case 17 axial direction while rotating the tire case 17. Heating the reinforcement cord 26 to a higher temperature than the melting point of the frame resin material for forming the tire case 17 (for example, heating the reinforcement cord 26 to a temperature of about 100° C. to 200° C.) means that the reinforcement cord 26 melts the frame resin material at the contact portion, enabling a portion, or the whole, of the reinforcement cord 26 to be embedded in the outer peripheral face of the tire case 17.

In the present exemplary embodiment, the reinforcement cord 26 is pressed by the first roller 60 and the second roller 64, and embedded in the outer peripheral portion of the tire case 17. The embedding amount of the reinforcement cord 26 can be adjusted using such factors as the temperature of the reinforcement cord 26 and the tension acting on the reinforcement cord 26. Note that the tension acting on the reinforcement cord 26 is adjustable, for example, by applying braking to the reel 58, or by providing a tension regulating roller on the conveying path of the reinforcement cord 26.

Tread Layering Process (5) Explanation next follows regarding the tread layering process.

The already vulcanized, band shaped, tread 30 is wrapped once onto the outer peripheral face of the tire case 17, and the tread 30 is bonded to the outer peripheral face of the tire case 17 using, for example, a bonding agent or non-vulcanized rubber (when non-vulcanized rubber is employed, vulcanization is performed in a later process to achieve bonding). Note that the tread 30 may, for example, employ a conventional pre-cure tread employed in recycled tires. Examples of bonding agents that may be employed as the bonding agent include triazine thiol based bonding agents, chlorinated rubber based bonding agents, phenol based resin bonding agents, isocyanate based bonding agents, and halogenated rubber based bonding agents. The location for bonding the tread 30 is preferably pre-buffed to roughen the surface, and cleaned with a cleaner, such as alcohol. Treatments such as corona treatment or ultraviolet radiation treatment may be performed to the joining location of the tire half bodies 17H prior to bonding, in order facilitate adhesion of the welding resin material 43.

Note that already vulcanized refers to a state in which vulcanization has proceed to the amount required in a finished product, and a semi-vulcanized state refers to a higher degree of vulcanization than in a non-vulcanized state, but without reaching the amount of vulcanization required in a finished product.

A tread pattern, such as the grooves 30A, is formed in advance in the tread face side (the outer peripheral side) of the tread 30 when it is in a semi-vulcanized state, or a vulcanized state. To form the tread pattern, a non-vulcanized tread 30 is vulcanized in a mold, to mold a semi-vulcanized, or vulcanized tread 30.

(6) The seal layer 24 made from vulcanized rubber is bonded to the bead sections 12 of the tire case 17, such as by use of a bonding agent, thereby completing the tire 10 illustrated in FIG. 1.

(7) Then finally, the diameter of the tire support section 40 is reduced, the completed tire 10 is removed from the tire support section 40, and the tire-inner-face support ring 72 inside deformed by bending and removed from the tire.

Note that in the tire manufacturing method according to the present exemplary embodiment, the processing sequence can be varied as appropriate.

Figure 15:
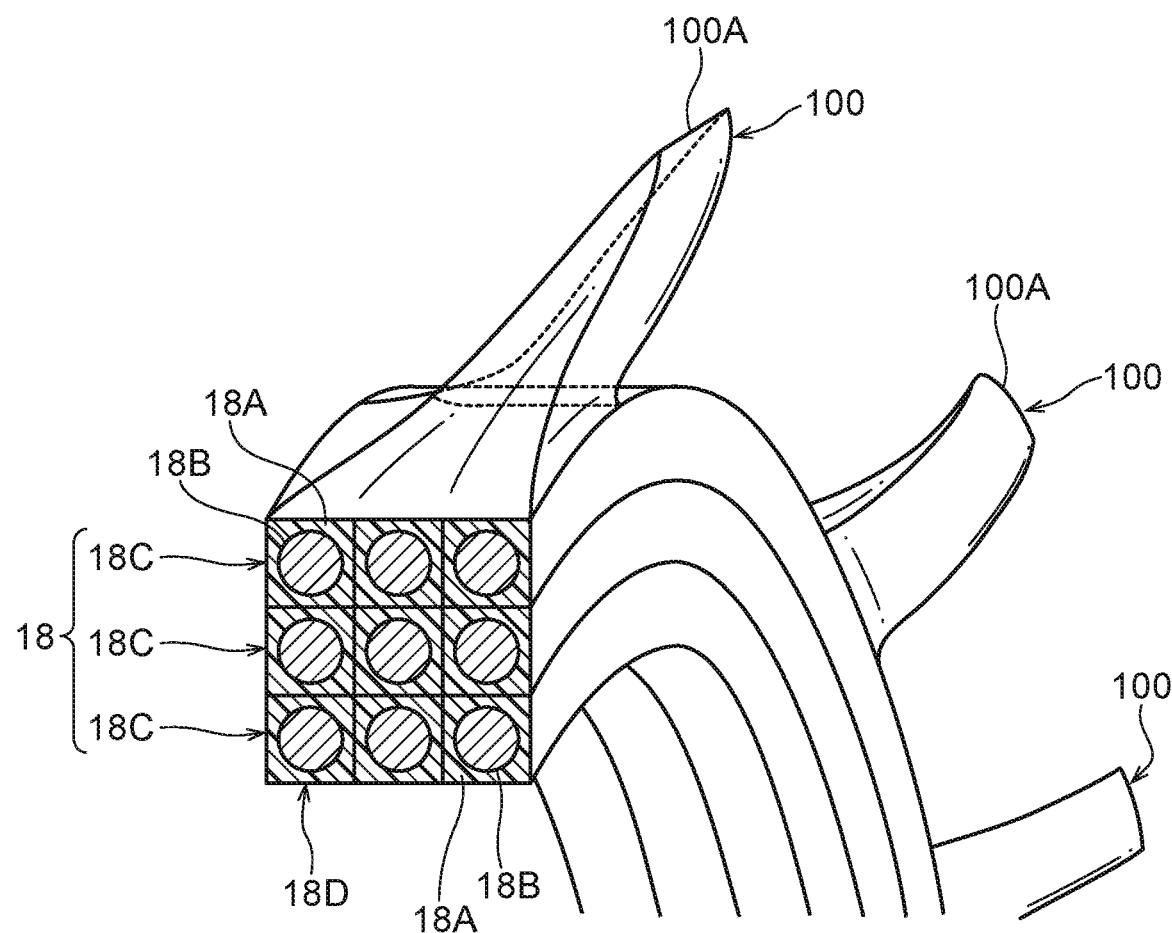
FIG. 15 illustrates a modified example of a process to form a covered bead core of the first exemplary embodiment.

In the above manufacturing method of the tire 10, the extension portions 100 are formed during pouring of the molten-state frame resin material 17A into the cavity S, however the manufacturing method of the tire 10 is not limited thereto, and the extension portions 100 may be formed in the covered bead core forming process. More specifically, as illustrated in FIG. 15, configuration may be made such that pre-formed extension portions 100 are joined by bonding agent or welding to tire radial direction outside portions of the circular ring shaped covered bead core 18 that has been formed in the above covered bead core forming process. Such a configuration enables the covering resin material for forming the covered bead core 18 and the resin material for forming the extension portions 100 to be different materials from each other.

Explanation next follows regarding the advantageous effects of the tire 10 according to the present exemplary embodiment.

In the tire 10, the resin layer 18D of the covered bead core 18, and the extension portions 100 extending out from the covered bead core 18, are respectively joined to the tire case 17. This thereby increases the joining surface area between the covered bead core 18 and the tire case 17, raising the joining force between the tire case 17 and the covered bead core 18.

In particular, due to plural of the extension portions 100 being formed at intervals around the tire circumferential direction, the total joining surface area between the extension portions 100 and the tire case 17 is large, further raising the joining force between the tire case 17 and the covered bead core 18.

The length of the extension portions 100 can also be lengthened due to the extension portions 100 extending from the covered bead core 18 toward the tire radial direction outside.

Forces received by the tire 10 during running (and the direction of forces) are different in each of the bead sections 12, the side sections 14, and the crown section 16. Thus in the tire 10, the extension portions 100 are inserted into the side sections 14 that receive different forces to those of the bead sections 12. Hence even if delamination were to occur between the extension portions 100 and the bead sections 12, such delamination is not liable to propagate as far as to between the extension portions 100 and the side sections 14. Moreover, for example, even if delamination occurs between the extension portions 100 and the side sections 14, the delamination is not liable to propagate as far as to between the extension portions 100 and the bead sections 12. The tire 10 is accordingly capable of suppressing the propagation of delamination between the extension portions 100 and the tire case 17.

Moreover, in the tire 10, the extension portions 100 and the tire case 17 are joined together by welding, thereby enabling a simple and strong joint therebetween.

Moreover, due to the tire 10 employing a frame resin material for forming the tire case 17 that exhibits thermoplasticity, damage such as cuts incurred by the tire case 17 may be repaired by melting the frame resin material at the vicinity of the cut, or repaired by infilling the cut with the same frame resin material in a molten-state. Namely, the thermo-plasticity of the frame resin material enables simple and reliable repair to be executed on the tire case 17.

In the tire 10, the extension portions 100 are formed of the same material as the covering resin material for forming the resin layer 18D of the covered bead core 18, enabling production costs to be suppressed. In particular, in the present exemplary embodiment, due to forming the extension portions 100 by extending a portion of the covering resin material configuring the resin layer 18D toward the tire radial direction outside, in comparison, for example, to joining separate bodies of extension portions 100 to the covered bead core 18, a process to join separate bodies of extension portions 100 to the covered bead core 18 is made redundant, and sufficient strength can be secured between the covered bead core 18 and the extension portions 100.

In the tire 10, the covered bead core 18 is formed by winding the bead cords 18B covered by, and joined to, the covering layers 18A formed from the covering resin material, plural times along the tire circumferential direction and joining together the covering layers 18A of the adjacent bead cords 18B. This thereby enables a strong joint to be achieved between the covering layers 18A formed from the covering resin material and the bead cords 18B. Movement of the bead cords 18B can also be effectively suppressed by the covering layers 18A.

In the tire 10, a strong joint can be achieved between the covering layers 18A and the bead cords 18B due to a bonding agent being employed to bond together the covering layers 18A formed from the covering resin material and the bead cords 18B.

In the tire 10, the tensile strength and heat resistance of the bead cords 18B is improved due to employing a steel monofilament as the bead cord 18B.

Thus the tire 10 enables the joining force of the covered bead core 18 to the tire case 17 to be raised.

In the tire 10 of the first exemplary embodiment, a bead structure is adopted in which the covered bead core 18 is covered by the covering layer 18A, and the single strand of bead cord 18B joined to the covering layer 18A is wound plural times along the tire circumferential direction, with the covering layers 18A of adjacent bead cords 18B joined together.

However, the present invention is not limited to such a bead structure, and another bead structure may be employed. For example, a bead structure may be employed in which plural strands of bead cord 18B are placed side-by-side and the covering layers 18A of adjacent bead cords 18B joined together to form a single row of bead cords 18B. This single row is then wound plural times along the tire circumferential direction and overlapped with itself. The covering layers 18A of the overlapping single rows of bead cords 18B are then joined to each other to form the bead structure.

Figure 20:
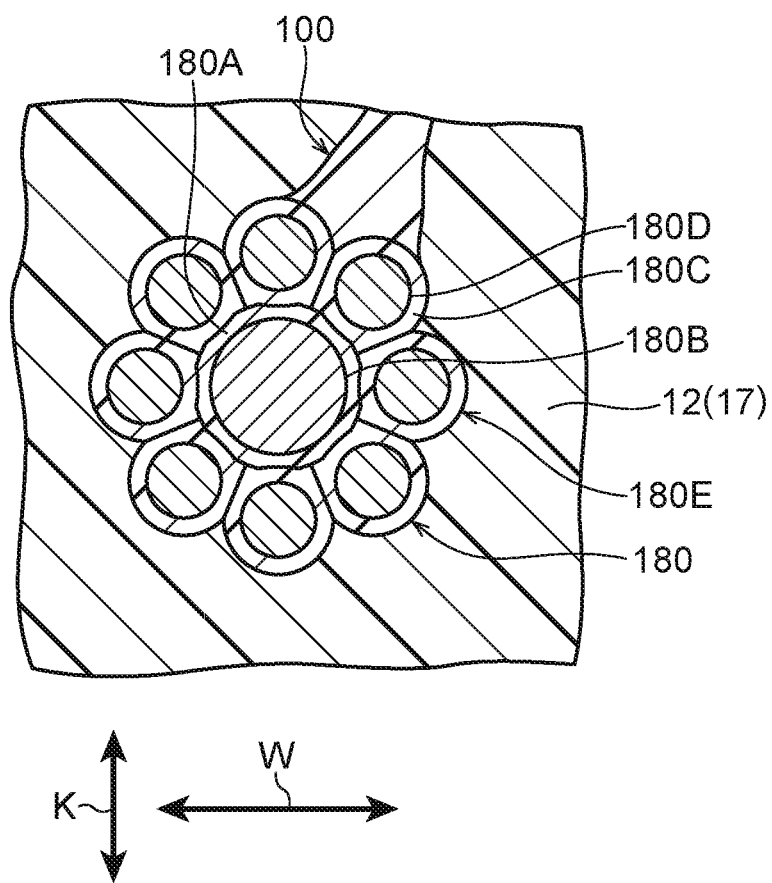
FIG. 20 is a cross-section taken along the tire width direction of a bead portion, illustrating the vicinity of a covered bead core of a modified example of a tire according to the first exemplary embodiment.

The bead structure of a covered bead cord 180 illustrated in FIG. 20, a modified example of the covered bead core 18, may also be employed. More specifically, the covered bead cord 180 is formed by winding small diameter bead cords 180D (with a smaller diameter than a bead cord 180B), covered by, and joined to, covering layers 180C formed from a covering resin material, in a spiral shape at the periphery of the bead cord 180B, covered by, and joined to, a covering layer 180A formed in a ring shape from a covering resin material. The covering layer 180A of the bead cord 180B is then joined to the covering layers 180C of the small diameter bead cords 180D, and the covering layers 180C of the adjacent small diameter bead cords 180D are joined together. Note that the outer layer portion of the covered bead core 180 is configured by a resin layer 180E formed with the covering resin material. Moreover, joining together the covering layers of the bead cords may be achieved by any method such as joining with a bonding agent, joining by welding, or joining with another method, as stated above. Note that the same also applies to tires of a second exemplary embodiment to a fifth exemplary embodiment, described below.

Second Exemplary Embodiment

Figure 16:
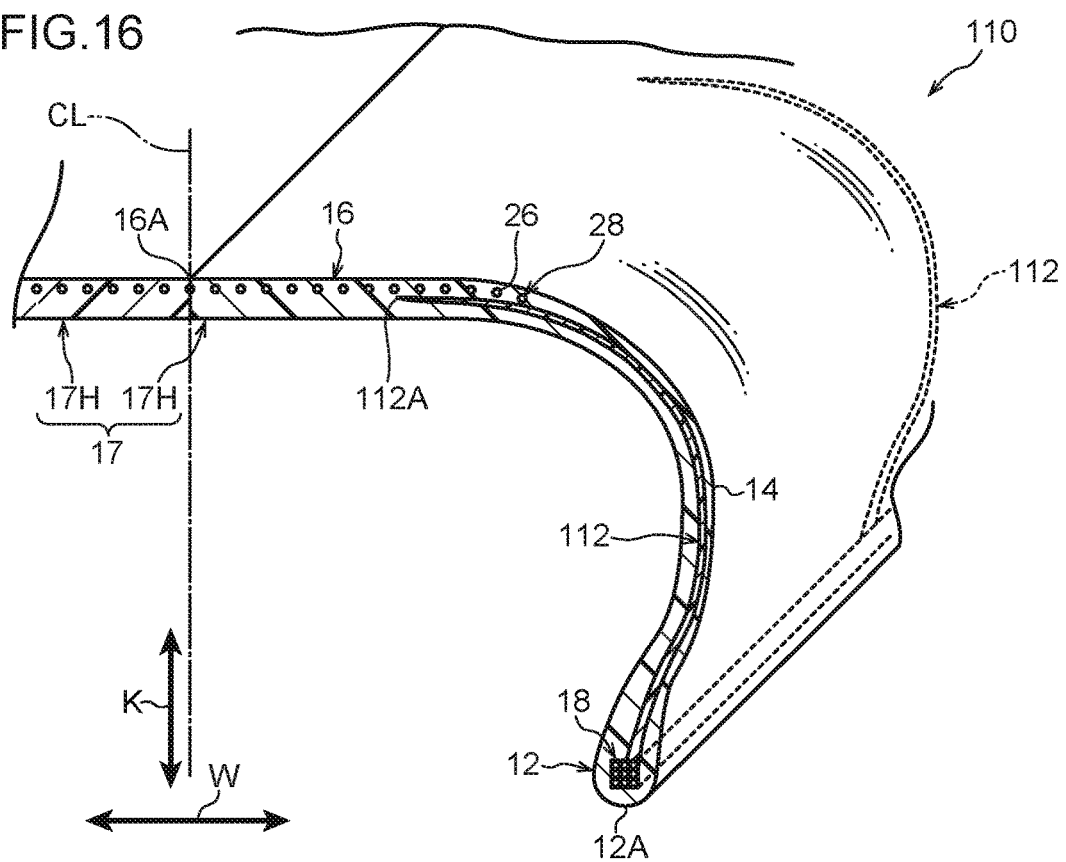
FIG. 16 is a perspective view illustrating a tire width direction cross-section of a tire case of a second exemplary embodiment.

Explanation next follows regarding a tire of a second exemplary embodiment according to the present invention, with reference to FIG. 16. Note that the same reference numerals are appended to similar configuration to that of the first exemplary embodiment, and further explanation omitted thereof.

As illustrated in FIG. 16, a tire 110 of the present exemplary embodiment is configured the same as the tire 10 of the first exemplary embodiment, except for in the configuration of extension portions 112. Explanation accordingly follows regarding the configuration of the extension portions 112. Note that the seal layer 24 and the tread 30 are omitted from illustration in FIG. 16.

The extension portions 112 of the present exemplary embodiment are inserted into the crown section 16. More specifically, leading end portions 112A of the extension portions 112 extend as far as the vicinity of the tire equatorial plane CL. Note that the resin material for forming the extension portions 112 is the same material as the covering resin material for forming the resin layer 18D of the covered bead core 18 (the collective body of the covering layers 18A).

Explanation next follows regarding the operation and advantageous effects of the tire 110 according to the second exemplary embodiment. Note that explanation is omitted of advantageous effects of the present exemplary embodiment that are similar to the operation and advantageous effects of the first exemplary embodiment.

In the tire 110 of the present exemplary embodiment, the extension portions 112 are inserted into the crown section 16, that receives different forces to those on the bead sections 12 and the side sections 14. This thereby enables the propagation of delamination between the extension portions 112 and the tire case 17 to be effectively suppressed.

Third Exemplary Embodiment

Figure 17:
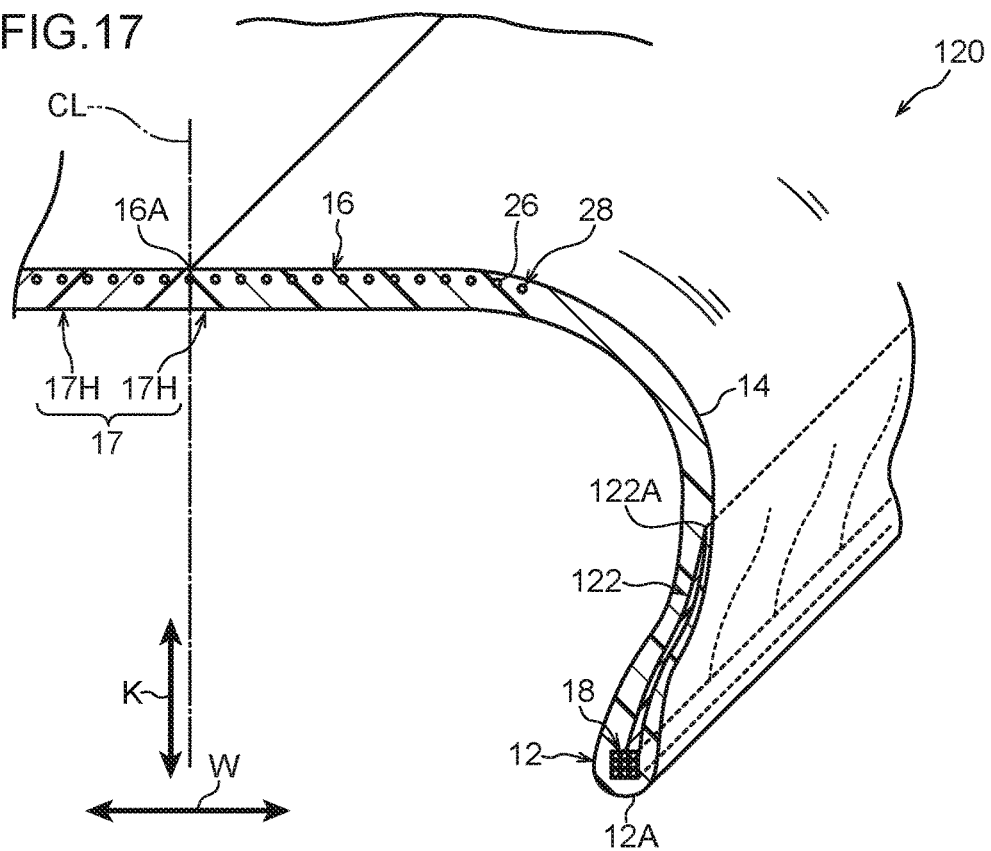
FIG. 17 is a perspective view illustrating a tire width direction cross-section of a tire case of a third exemplary embodiment.

Explanation next follows regarding a tire of a third exemplary embodiment according to the present invention, with reference to FIG. 17. Note that the same reference numerals are appended to similar configuration to that of the first exemplary embodiment, and further explanation omitted thereof.

As illustrated in FIG. 17, a tire 120 of the present exemplary embodiment is configured the same as the tire 10 of the first exemplary embodiment, except for in the configuration of extension portions 122. Explanation accordingly follows regarding the configuration of the extension portions 122. Note that the seal layer 24 and the tread 30 are omitted from illustration in FIG. 17.

Each of the extension portions 122 of the present exemplary embodiment is inserted into the respective side section 14, and is continuous in the tire circumferential direction. The leading end portions 122A of the extension portions 122 extend as far as a tire radial direction intermediate portion of the side sections 14. Note that the resin material for forming the extension portions 122 is the same material as the covering resin material for forming the resin layer 18D of the covered bead core 18 (the collective body of the covering layers 18A).

Explanation next follows regarding the operation and advantageous effects of the tire 120 of the third exemplary embodiment. Note that explanation is omitted of advantageous effects of the present exemplary embodiment that are similar to the operation and advantageous effects of the first exemplary embodiment.

In the tire 120 of the present exemplary embodiment, the extension portions 122 are each continuous in the tire circumferential direction, thereby enabling the joining surface area between the extension portions 122 and the tire case 17 to be made larger than that of the extension portions 100 of the first exemplary embodiment.

The configuration of the extension portions 112 of the second exemplary embodiment may also be applied to the extension portions 122 of the third exemplary embodiment, in a configuration in which the extension portions 122 are inserted into the crown section 16.

Explanation next follows regarding the method of forming the extension portions 122 to the covered bead core 18 of the tire 120 in the third exemplary embodiment.

In the present exemplary embodiment, in a molten state of the resin layer 18D of the covered bead core 18, formed in the covered bead core forming process, each of the extension portions 122 is joined by welding to the covered bead core 18 by inserting the covered bead core 18 into the circular ring shaped extension portion 122. Note that a molten state may be induced at the inner peripheral face of the extension portions 122 and each of the extension portions 122 and the covered bead core 18 joined together by welding, or they may be joined together by welding by inducing a molten state for both the inner peripheral face of the extension portions 122 and the resin layer 18D of the covered bead core 18. The extension portions 122 may also be divided into plural sections, and the divided extension portions 122 joined to the resin layer 18D of the covered bead core 18 by welding, resulting in ring shaped extension portions 122. Note that divided extension portions 122 adjacent in the tire circumferential direction are preferably joined together by welding.

Plural individual through holes may also be formed in the extension portions 122. Forming through holes in the extension portions 122 enables the molten-state frame resin material 17A to pass through the through holes when pouring the molten-state frame resin material 17A into the cavity S, facilitating the molten-state frame resin material 17A to flow around to the front side and the back side of the extension portions 122 (the tire inside and outside). This thereby enables the time taken until the molten-state frame resin material 17A inside the cavity has completely flowed around to be shortened, enabling thermal degradation of the frame resin material to be effectively suppressed.

Fourth Exemplary Embodiment

Figure 18:
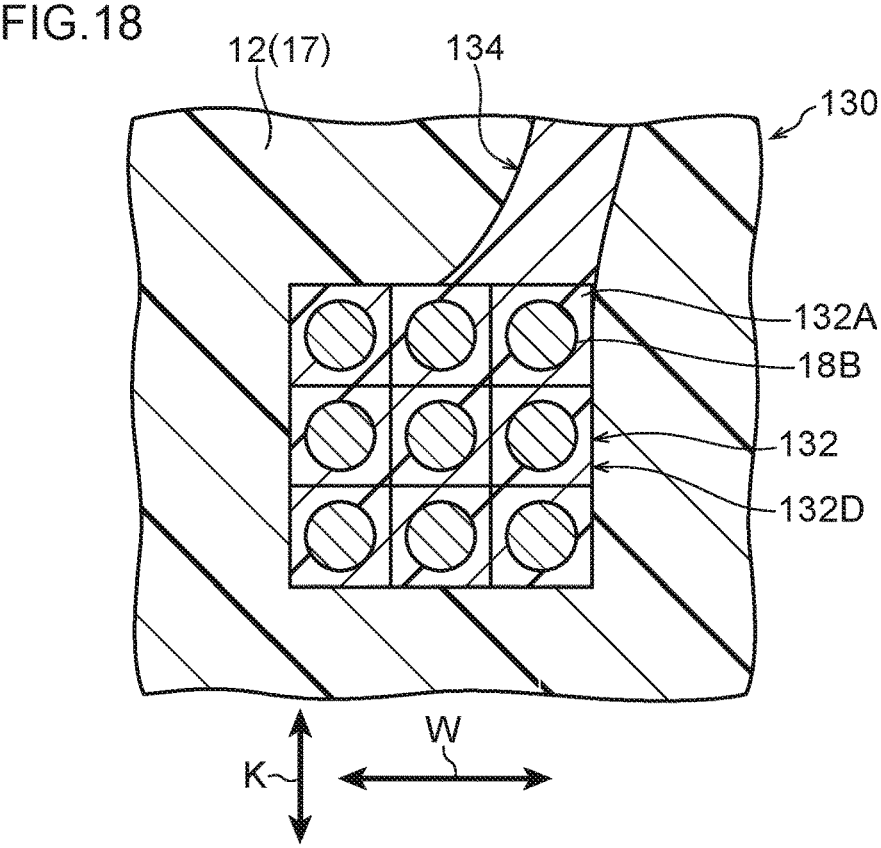
FIG. 18 is a cross-section taken along the tire width direction of a bead portion, illustrating the vicinity of a covered bead core according to a fourth exemplary embodiment.

Explanation next follows a tire of a fourth exemplary embodiment according to the present invention, with reference to FIG. 18. Note that the same reference numerals are appended to similar configuration to that of the first exemplary embodiment, and further explanation omitted thereof. As illustrated in FIG. 18, a tire 130 of the present exemplary embodiment is configured the same as the tire 10 of the first exemplary embodiment, except for in the configuration of a covering resin material for forming a resin layer 132D of a covered bead core 132, and of a resin material for forming extension portions 134. Explanation accordingly follows regarding the configuration of the covering resin material for forming the resin layer 132D, and of the resin material for forming the extension portions 134. Note that FIG. 18 only illustrates the vicinity of the covered bead core 132, and other locations of the tire 130 are omitted.

The covered bead core 132 of the present exemplary embodiment is formed by using a covering resin material (for example an olefin based resin, an epoxy based resin, or a nylon based resin) of higher adhesion properties to the bead cord 18B than the frame resin material for forming the tire case 17 to form the covering layers 132A of the bead cord 18B. The resin layer 132D is configured by the covering layers 132A. Note that the resin material for forming the extension portions 134 is the same material as the covering resin material for forming the resin layer 132D of the covered bead core 132 (the collective body of the covering layers 132A).

Explanation next follows regarding the operation and advantageous effects of the tire 130 of the fourth exemplary embodiment. Note that explanation is omitted of advantageous effects of the present exemplary embodiment that are similar to the operation and advantageous effects of the first exemplary embodiment In the tire 130 of the present exemplary embodiment, forming the covering resin material for forming the resin layer 132D from a material having higher adhesion properties to the bead cord 18B than those of the frame resin material for forming the tire case 17, enables a strong joint (bond) to be achieved between both the covering resin material (the covering layers 132A) and the bead cord 18B, even without employing a bonding agent. There is accordingly a reduction in the process (work) to apply the bonding agent to the bead cord 18B, enabling productivity to be raised.

Note that the configuration of the extension portions 112 of the second exemplary embodiment may be applied to the extension portions 134 of the fourth exemplary embodiment, in a configuration in which the extension portions 134 are inserted into the crown section 16. The configuration of the extension portions 122 of the third exemplary embodiment may also be applied to the extension portions 134 of the fourth exemplary embodiment, in a configuration in which the extension portions 134 are continuous in the tire circumferential direction.

Fifth Exemplary Embodiment

Figure 19:
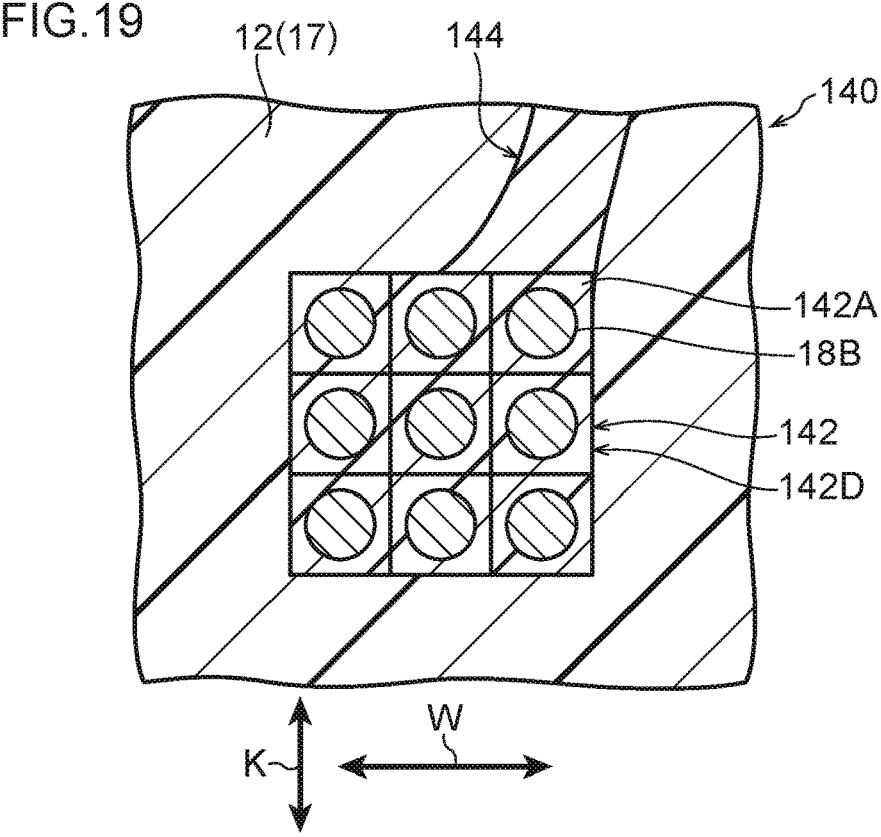
FIG. 19 is a cross-section taken along the tire width direction of a bead portion, illustrating the vicinity of a covered bead core according to a fifth exemplary embodiment.

Explanation next follows regarding a tire of a fifth exemplary embodiment according to the present invention, with reference to FIG. 19. Note that the same reference numerals are appended to similar configuration to that of the first exemplary embodiment, and further explanation omitted thereof.

As illustrated in FIG. 19, a tire 140 of the present exemplary embodiment is configured the same as the tire 10 of the first exemplary embodiment, except for in the configuration of a covering resin material for forming a resin layer 142D of a covered bead core 142, and of a resin material for forming extension portions 144. Explanation accordingly follows regarding the configuration of the covering resin material for forming the resin layer 142D of the covered bead core 142, and of the resin material for forming the extension portions 144. Note that FIG. 19 only illustrates the vicinity of the covered bead core 142, and other locations of the tire 140 are omitted.

In the present exemplary embodiment, the covering resin material for forming the resin layer 142D (the collective body of covering layers 142A) and the resin material for forming the extension portions 144 are each the same material as the frame resin material for forming the tire case 17.

Explanation next follows regarding the operation and advantageous effects of the tire 140 of the fifth exemplary embodiment. Note that explanation is omitted of advantageous effects of the present exemplary embodiment that are similar to the operation and advantageous effects of the first exemplary embodiment.

In the tire 140 of the present exemplary embodiment, employing the same material for the covering resin material for forming the resin layer 142D and the resin material of the extension portions 144 as the frame resin material for forming the tire case 17 during manufacture gives good mixing of the covering resin material for forming the resin layer 142D, and the resin material of the extension portions 144 with the frame resin material for forming the tire case 17, enabling the joining strength (weld) to be effectively raised.

In the tire 140, making the covering resin material for forming the resin layer 142D and the resin material of the extension portions 144 the same as the frame resin material for forming the tire case 17, also enables a reduction in production cost to be achieved over a case in which plural resin materials are employed.

Moreover, the configuration of the extension portions 112 of the second exemplary embodiment may be applied to the extension portions 144 of the fifth exemplary embodiment, in a configuration in which the extension portions 144 are inserted into the crown section 16. The configuration of the extension portions 122 of the third exemplary embodiment may also be applied to the extension portions 144 of the fifth exemplary embodiment, in a configuration in which the extension portions 144 are continuous in the tire circumferential direction.

Other Exemplary Embodiments

In the tire 10 of the first exemplary embodiment, the frame resin material of the tire case 17, the covering resin material of the resin layer 18D, and the resin material of the extension portions 100 are thermoplastic materials exhibiting thermoplasticity. However, the present invention is not limited thereto, and a thermosetting material may be employed for the frame resin material of the tire case 17 (for example a thermosetting resin), a thermosetting material may be employed for the covering resin material of the resin layer 18D, a thermosetting material may be employed for the resin material of the extension portions 100, or a thermosetting material may be employed for any combination of two, or for all, of the above. Note that preferably a bonding agent is employed for joining together a solidified thermosetting material and a thermosetting material in a molten state. However, the two members may be joined together by forming fine undulations on the surface of the solidified thermosetting material using surface roughening treatment, letting the molten-state thermosetting material flow into the fine undulations and solidify, so as to achieve an anchor effect.

Joining together of a solidified thermoplastic material and a thermosetting material in a molten state may be a joining configuration that uses a bonding agent, or a joining configuration that raises the temperature of the molten-state thermosetting material to higher than the melting point of the thermoplastic material, and causing the two members to mix.

Although exemplary embodiments have been given above as embodiments of the present invention, these exemplary embodiments are merely examples, and various modifications may be implemented within a range not departing from the spirit of the present invention. Obviously the scope of rights of the present invention is not limited to these exemplary embodiments.

The invention claimed is:

1. A method of manufacturing a tire, the method comprising:
   injection molding a tire frame member formed in a ring shape from a frame resin material, the tire frame member including a pair of bead sections disposed separated from each other along the tire width direction, a pair of side sections that extend from the pair of bead sections toward the tire radial direction outside, and a crown section that connects together the pair of side sections;
   forming a ring shaped bead core that is embedded in and joined to each of the bead sections by welding, the bead core being formed by a single strand, or plurality of strands, of bead cord extending in the tire circumferential direction, and covered with, and joined to, a covering resin material exhibiting thermo-plasticity; and forming an extension portion that extends from each of the bead cores in a direction that intersects with the tire circumferential direction when viewed from a tire side face, the extension portion formed as a result of melting and flowing the covering resin material together with the tire frame member, the extension portion being joined to the tire frame member by welding.

2. The method of claim 1, wherein the extension portion extends from the bead core toward the tire radial direction outside.

3. The method of claim 2, wherein the extension portion is inserted into the side section.

4. The method of claim 3, wherein the extension portion is inserted into the crown section.

5. The method of claim 1, wherein the extension portion is formed by extending a portion of the covering resin material configuring the bead core toward the tire radial direction outside.

6. The method of claim 1, wherein the covering resin material has higher adhesive properties to the bead cord than the frame resin material, and is bonded to the bead cord.

7. The method of claim 1, wherein the covering resin material and the frame resin material are the same material as each other.

8. The method of claim 1, wherein forming the bead core comprises:
    winding the bead cord, covered with and joined to the covering resin material, a plurality of times along the tire circumferential direction, and
    joining together the covering layers of the adjacent bead cords.

9. A method of manufacturing a tire, the method comprising:
    forming a ring shaped bead core by a single strand, or plurality of strands, of bead cord extending in a tire circumferential direction, the bead cord covered with and joined to a covering resin exhibiting thermoplasticity;
    placing the bead core in a mold; and
    injection molding a tire frame member formed in a ring shape, the tire frame member including a bead section, a side section that extends from the bead section toward a tire radial direction outside, and a crown section connected to the side section, the injection molding comprising:
    pouring a frame resin, in a molten state, into the mold through a gate, wherein the frame resin passes through the gate and around the bead core, wherein a surface of the covering resin of the bead core is melted and flows together with the frame resin; and
    solidifying the frame resin and the covering resin, wherein an extension portion is formed that extends from the bead core in a direction that intersects with the tire circumferential direction when viewed from a tire side face, the extension portion formed of the covering resin.

10. The method of claim 9, further comprising placing the bead core in a jig in the mold.

11. The method of claim 9, further comprising extruding the covering resin onto an outer periphery of the bead core.

12. The method of claim 9, wherein the bead core is embedded in and joined to the bead sections by welding.

13. The method of claim 9, wherein the extension portion extends from the bead core toward the tire radial direction outside.

14. The method of claim 13, wherein the extension portion extends into the side section.

15. The method of claim 14, wherein the extension portion extends into the crown section.

16. The method of claim 9, wherein the extension portion is one of a plurality of extension portions formed at intervals around the tire circumferential direction.

17. The method of claim 9, wherein the covering resin has higher adhesive properties to the bead cord than the frame resin, and is bonded to the bead cord.

18. The method of claim 9, wherein the covering resin and the frame resin are the same material as each other.

19. The method of claim 9, wherein forming the bead core comprises:
    winding the bead cord, covered with and joined to the covering resin, a plurality of times along the tire circumferential direction, and
    joining together the covering layers of adjacent bead cords.

* * * * *